(12) United States Patent
Abbas

(10) Patent No.: US 10,656,190 B2
(45) Date of Patent: May 19, 2020

(54) NON-PARAMETRIC STATISTICAL BEHAVIORAL IDENTIFICATION ECOSYSTEM FOR ELECTRICITY FRAUD DETECTION

(71) Applicant: Oracle International Corporation, Redwood Shores, CA (US)

(72) Inventor: Hussain Abbas, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 366 days.

(21) Appl. No.: 15/820,326

(22) Filed: Nov. 21, 2017

(65) Prior Publication Data

US 2018/0299495 A1 Oct. 18, 2018

Related U.S. Application Data

(60) Provisional application No. 62/485,319, filed on Apr. 13, 2017.

(51) Int. Cl.
*G01R 22/06* (2006.01)
*G01R 15/18* (2006.01)
(Continued)

(52) U.S. Cl.
CPC .......... *G01R 22/066* (2013.01); *G01R 22/063* (2013.01); *G06F 21/50* (2013.01);
(Continued)

(58) Field of Classification Search
CPC .......... G01R 22/06; G01R 15/18; G01R 1/00; G01R 19/00; G06K 9/00; G06K 9/62; G06N 7/00
See application file for complete search history.

(56) References Cited

U.S. PATENT DOCUMENTS 7,936,163 B2 * 5/2011 Lee, Jr. ............... G01R 22/066
324/110
9,396,438 B2 7/2016 McConky et al.
(Continued)

FOREIGN PATENT DOCUMENTS

CN 102967735 A 3/2013
CN 205193128 U 4/2016
(Continued)

OTHER PUBLICATIONS

PCT/US2018/022718 received an International Search Report and Written Opinion dated Jun. 27, 2018, 12 pages.
(Continued)

*Primary Examiner* — Neel D Shah
(74) *Attorney, Agent, or Firm* — Kilpatrick Townsend & Stockton LLP

(57) ABSTRACT

Embodiments of the disclosure are directed towards electricity fraud detection systems that involve a behavioral detection ecosystem to improve the detection rate of electricity fraud while reducing the rate of false-positives. More specifically, machine learning algorithms are eschewed in favor of two separate models that are applied sequentially. The first model is directed to improving the detection rate of electricity fraud through the use of detectors to identify customers engaging in suspicious behavior based on the demand profiles of those customers. The second model is directed to reducing the rate of false-positives by identifying potential legitimate explanations for any suspicious behavior. Subtracting away the suspicious behavior with legitimate explanations leaves only the identified, unexplained suspicious behavior that is highly likely to be associated with fraudulent activity.

20 Claims, 27 Drawing Sheets

(51) Int. Cl.
| | |
|---|---|
| G01R 1/00 | (2006.01) |
| G01R 19/00 | (2006.01) |
| G06K 9/00 | (2006.01) |
| G06N 7/00 | (2006.01) |
| G06Q 50/06 | (2012.01) |
| G06K 9/62 | (2006.01) |
| G06F 21/50 | (2013.01) |

(52) U.S. Cl.
CPC ......... G06K 9/0055 (2013.01); G06K 9/6223 (2013.01); G06Q 50/06 (2013.01)

(56) References Cited

U.S. PATENT DOCUMENTS

| | | | |
|---|---|---|---|
| 2014/0358838 A1 | 12/2014 | Dhurandhar et al. | |
| 2014/0358839 A1* | 12/2014 | Dhurandhar | G01D 4/00 706/48 |
| 2016/0161539 A1 | 6/2016 | Kraft | |

FOREIGN PATENT DOCUMENTS

| | | |
|---|---|---|
| WO | 03/038666 A1 | 5/2003 |
| WO | 2013112639 A1 | 8/2013 |

OTHER PUBLICATIONS

Di Martino et al., "Improving Electric Fraud Detection Using Class Imbalance Strategies" International Conference on Pattern Recognition Applications and Methods, 2012, pp. 135-141.

Coma-Puig et al., "Fraud Detection in Energy Consumption Supervised Approach" http://www.lsi.upc.es/~gavalda/papers/dsaa2016.pdf, 2016, 10 pages.

Mandava et al., "Automation of Power Theft Detection Using PNN Classifier" International Journal of Artificial Intelligence and Mechatronics, vol. 3, Issue 4, ISSN 2320-5121, Copyright © 2014, pp. 118-122.

Yap et al., "Detection of Abnormalities and Electricity Theft using Genetic Support Vector Machines" IEEE Xplore, downloaded on Mar. 1, 2009, pp. 1-6.

Nagi et al., "Improving SVM-Based Nontechnical Loss Detection in Power Utility Using the Fuzzy Inference System" IEEE Transactions on Power Delivery, vol. 26, No. 2, Apr. 2011, pp. 1284-1285.

* cited by examiner

| sp_id | demand | service_date | yr | qt | mn | wd | day |
|---|---|---|---|---|---|---|---|
| 1 | 4.991051e-320 | 41 | 16436 | 2015 | 1 | 1 | 5 | 1 |
| 2 | 4.991051e-320 | 39 | 16437 | 2015 | 1 | 1 | 6 | 2 |
| 3 | 4.991051e-320 | 28 | 16438 | 2015 | 1 | 1 | 7 | 3 |

FIG. 3A

|   | fraud_date | total | sp_id |
|---|---|---|---|
| 1 | 16541 | 408 | 4.496724e-316 |
| 2 | 16668 | 189 | 6.525977e-315 |
| 3 | 16645 | 290 | 2.150877e-314 |

320 → fraud_date  
322 → total  
324 → sp_id

FIG. 3B

|   | quantile | med_demand | num |
|---|---|---|---|
| a | 0 | 0 | 0 |
| b | 1 | 0 | 0 |
| c | 2 | 0 | 0 |
| d | 5 | 0 | 0 |
| e | 10 | 0 | 0 |
| f | 20 | 0 | 19 |
| g | 50 | 20.055 | 9 |
| h | 75 | 34.5145 | 9 |
| i | 100 | 56.912 | 1 |

FIG. 4A

| | demand |
|---|---|
| Min. | 0.000 |
| 1st Qu. | 0.000 |
| Median | 1.000 |
| Mean | 6.704 |
| 3rd Qu. | 5.000 |
| Max. | 54.000 |

FIG. 6A

| | fraud_always_zero | fraud_med_zero | fraud_near_zero | u_always_zero | u_med_zero | u_near_zero |
|---|---|---|---|---|---|---|
| Detected | 2 | 7 | 6 | 6556 | 6375 | 21788 |
| Lot Size < 500 | 0 | 0 | 0 | 6 | 2 | 9 |
| Solar User | 0 | 0 | 0 | 0 | 0 | 10 |

FIG. 7

Fa_Date < Fraud_Date

| | fa_type_desc | num |
|---|---|---|
| 1 | Meter Cut - Non Pay - Pre Pay | 81 |
| 2 | Mtr Reconnect After Pay - TBO-E-PP | 72 |
| 3 | Meter Cut - Non Pay - Pre Pay | 64 |
| 4 | Meter Off - FIELD ONLY | 61 |
| 5 | FA to Mtr Reading for NO READS | 41 |
| 6 | Meter Cut On | 36 |
| 7 | Mtr Reconnect After Pay - TBO | 36 |
| 8 | Back to Back/Read & Leave | 29 |
| 9 | Virtual CNC | 19 |
| 10 | Service Risk Investigation | 11 |

Fa_Date = Fraud_Date

| | fa_type_desc | num |
|---|---|---|
| 1 | Tampering | 39 |
| 2 | Pole cut for safety | 34 |
| 3 | Service Risk Investigation | 27 |
| 4 | Locate, Label and disconnect | 23 |
| 5 | Jumpers in Meter | 17 |
| 6 | Meter Cut - Non Pay | 6 |
| 7 | Service Risk Follup | 6 |
| 8 | Field Verification | 4 |
| 9 | Virtual CNC | 4 |
| 10 | NMR Tampering | 3 |

Fa_Date > Fraud_Date

| | fa_type_desc | num |
|---|---|---|
| 1 | Meter Cut - Non Pay - Pre Pay | 67 |
| 2 | Mtr Reconnect After Pay - TBO-E-PP | 63 |
| 3 | Meter Install | 60 |
| 4 | Meter Cut On | 47 |
| 5 | Back to Back/Read & Leave | 46 |
| 6 | Pole Connect (SOCC) | 44 |
| 7 | Service Risk Appt | 39 |
| 8 | Meter Cut - Non Pay | 34 |
| 9 | Meter Off - FIELD ONLY | 33 |
| 10 | Service Risk Follup | 30 |

FIG. 10

NON-PARAMETRIC STATISTICAL BEHAVIORAL IDENTIFICATION ECOSYSTEM FOR ELECTRICITY FRAUD DETECTION

CROSS-REFERENCES TO RELATED APPLICATIONS

This application claims the benefit of and the priority to U.S. Provisional Application No. 62/485,319, filed on Apr. 13, 2017, titled "NOVEL NON-PARAMETRIC STATISTICAL BEHAVIORAL IDENTIFICATION ECOSYSTEM FOR ELECTRICITY FRAUD DETECTION", and hereby incorporated by reference in its entirety for all purposes.

BACKGROUND

Customers of electric utility companies sometimes commit fraud by stealing electricity without paying for it. This is a significant problem for the electric utility companies, as the detection of fraud on a widespread scale is difficult.

Traditionally, electric utility companies have relied on one of three methods for detecting fraud: (1) a human analyst with deep subject matter expertise and access to a diverse set of a data sources, such as housing permits; (2) a rules-based system provided by the manufacturer of the electric metering technology; or (3) a luck-based system, in which other customers notify the electric utility company of obvious cases of fraud (e.g., their neighbor is clearly stealing electricity). These methods are unreliable, which is evidenced by the majority of fraud cases being identified through the luck-based system.

The unreliability of these methods stems from a combination of low detection rates and high false-positive rates. Some estimates place the false positive rate of these traditional methods at 80%, such that the vast majority of detected fraud cases are not actually occurrences of fraud. This has resulted in a large expense for electric utility companies, to the point where catching fraud is no longer beneficial from a cost/benefit standpoint. This economic infeasibility of catching fraud has further compounded the problem by emboldening existing fraudsters and encouraging potential fraudsters to commit fraud.

Thus, there exists a need for a reliable, electricity fraud detection system that can detect fraud without low detection rates and high false-positive rates and which is sufficiently robust to be applied to both residential and industrial electricity fraud detection. Embodiments of the present disclosure are directed to addressing at least these needs.

BRIEF SUMMARY

In some embodiments, a computing system is disclosed that comprises one or more data stores, storing a known dataset including first data items associated with known cases of electrical fraud and an unknown dataset including second data items associated with unknown cases of electrical fraud at a plurality of service points, wherein each service point of the plurality of service points corresponds to an electricity meter, and wherein the second data items include electricity demand associated with the electricity meter corresponding to each service point.

The computing system may also comprise a computer processor and a computer readable storage medium storing program instructions configured for execution by the computer processor, in order to cause the computer processor to access the known dataset and determine a set of suspicious known cases by at least applying a detector behavior of a model to the first data items. In some embodiments, the instructions may cause the computer processor to determine, from the set of suspicious known cases, a set of explained known cases by analyzing each of the known cases in the set of suspicious known cases against one or more false positive explanations of the model, wherein the set of explained known cases is a subset of the set of suspicious known cases. In some embodiments, the instructions may cause the computer processor to validate the model based on the determined set of suspicious known cases, access the unknown dataset, and/or determine a set of suspicious unknown cases by at least applying the detector behavior to the second data items. In some embodiments, the instructions may cause the computer processor to determine, from the set of suspicious unknown cases, a set of explained unknown cases by analyzing each of the unknown cases in the set of suspicious unknown cases against the one or more false positive explanations, wherein the set of explained unknown cases is a subset of the set of suspicious unknown cases. In some embodiments, the instructions may cause the computer processor to determine a set of unexplained unknown cases by subtracting the set of explained unknown cases from the set of suspicious unknown cases, wherein the set of unexplained unknown cases is a subset of the set of suspicious unknown cases that does not overlap with the set of explained unknown cases.

BRIEF DESCRIPTION OF THE DRAWINGS

FIG. 3A illustrates an example of demand data usable for electricity fraud detection in accordance with embodiments of the present disclosure.

FIG. 3B illustrates an example of fraud data usable for electricity fraud detection in accordance with embodiments of the present disclosure.

FIG. 4A illustrates an example distribution table usable for electricity fraud detection in accordance with embodiments of the present disclosure.

FIG. 6A illustrates an example demand profile of a customer in accordance with embodiments of the present disclosure.

FIG. 7 illustrates an example results table in accordance with embodiments of the present disclosure.

FIG. 10 illustrates example field activity flags corresponding to legitimate explanations of suspicious behavior in accordance with embodiments of the present disclosure.

DETAILED DESCRIPTION

Figure 1:
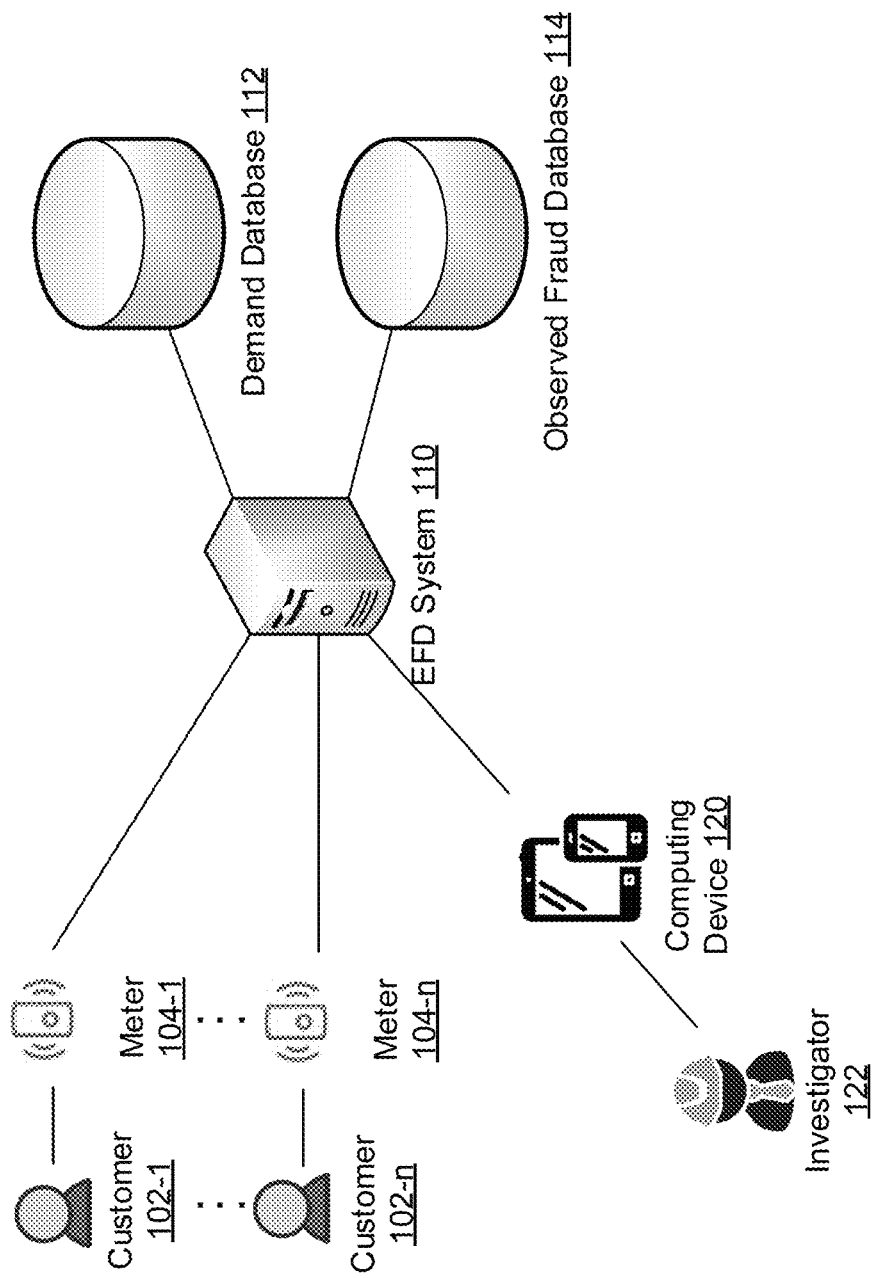
FIG. 1 illustrates a system diagram for electricity fraud detection in accordance with embodiments of the present disclosure.

In the following description, for the purposes of explanation, specific details are set forth in order to provide a thorough understanding of embodiments of the invention. However, it will be apparent that various embodiments may be practiced without these specific details. The figures and description are not intended to be restrictive.

Systems depicted in some of the figures may be provided in various configurations. In certain embodiments, the systems may be configured as a distributed system where one or more components of the system are distributed across one or more networks in a cloud computing system. In certain embodiments, the systems may be configured to operate in virtual or non-virtual environments.

Introduction

As previously mentioned, customers of electric utility companies sometimes commit fraud by stealing electricity without paying for it. It has been difficult for electric utility companies to detect this fraud with existing systems due to a combination of low detection rates and high false-positive rates. In other words, the systems cannot detect the fraud, and the few times it does detect the fraud, there is not actually any fraud occurring.

The use of machine learning algorithms applied to fraud detection is unlikely to address these shortcomings due to various reasons. First, machine learning algorithms, such as supervised learning methods (e.g., Classification—SVM) configured to classify customer behavior as fraudulent or non-fraudulent, tend to memorize patterns from past observations in order to apply to future predictions. Unfortunately, the limited number of past observations of actual fraud creates a cold start problem for the machine learning algorithms; there is not enough data on fraud cases to produce reliable predictions from the machine learning algorithms. Because the algorithms can only detect cases similar to the limited number of cases used to train the algorithms, there would potentially be many cases of fraud undetected by the algorithms as they were not identified in the first place in the training set. The machine learning algorithms are limited in what they can detect because they can only detect what has already happened in the past. The problem of low detection rates would likely persist.

Furthermore, machine learning algorithms are often limited in regards to explaining causal inference. Understanding causation and the relationships between inputs of a model can be helpful for building robust models. More complex models (e.g., models that make more assumptions) incur more risk, and with that increase in risk should come a measurable statistically significant uplift in performance to ensure the proper balance between complexity and robustness.

Additionally, committers of electricity fraud frequently change their behavior when they are being investigated or suspect they are being investigated. Therefore, training a machine learning algorithm to identify fraudulent behavior based on past patterns may be flawed as those patterns of behavior may change over time.

To avoid these shortcomings, an electricity fraud detection system can be designed from the ground up that separately treats the problems of low detection rates and high false-positive rates rather than treating them in a connected way. In other words, the problem of electricity fraud detection can be broken down into two separate sub-problems that are addressed using two separate models that can be applied sequentially; one model can be directed to detecting fraud with a high detection rate, and the other model can be directed to reducing false-positives in order to filter the results produced by the first model.

Conceptually, the sub-problem of detecting fraudulent behavior may be prioritized first because having low detection rates leaves many cases of fraud unidentified (the "unknown unknowns"), which add significant costs to electric utility companies. Thus, the first model (e.g., a detector model) may be configured for detecting fraudulent behavior using various detectors of fraudulent activity. However, in order to detect previously unidentified cases of fraud, such a model should not use detectors that are constructed using a training set of previously identified fraud (because they do not account for the unidentified fraud). In some embodiments, the detectors of this model may be directly based on the demand, or the electricity usage, of the customers rather than observed cases of past fraud. The detectors may be configured to detect various forms of suspicious behavior within the demand profile that results in a reduction in revenue for the company.

There may then be a second model (e.g., a false positive model) focused on lowering the false positives by trying to find legitimate, non-fraudulent explanations of the suspicious behavior associated with the cases detected by the first model. This second model is used to rule out any legitimately explained suspicious behavior, leaving behind cases that are highly likely to be fraud.

To put it another way, there may be a "pipeline" in which a pattern is specified (e.g., a detector) that results in a loss of revenue to the firm. This pattern may be referred to as "abnormal behavior", or just "behavior" for short. A search can be conducted to identify instances of the behavior. The false positive rules engine is run against these search results in order to rule out false positives. The cases that remain (e.g., search results not ruled out as false positives) are cases that have a higher likelihood to be fraud. This pipeline can be applied against both (1) the set of known fraud cases; and (2) the set of unknown unknowns (the set of everything else).

When the pipeline is applied to (1) the set of known fraud cases, the result obtained includes: (A) the number of known fraud cases which the detector detected; (B) the number of known fraud cases which the detector did not detect; (C) within the set of detected behaviors, the number of cases that were explained away with the false positive rules engine, with a numeric breakdown of why they were explained away; and (D) within the set of detected behaviors, the number of cases that were not explained away with the false positive rules engine.

When the pipeline is applied to (2) the set of unknown unknowns, the result obtained includes (A) the number of cases in which the detector detected behaviors; (B) the number of cases which the detector did not detect any behaviors; (C) within the set of detected behaviors, the number of cases that were explained away with the false positives rules engine, with a numeric breakdown of why they were explained; and (D) within the set of detected behaviors, the number of cases that were not explained away with the false positives rules engine.

By applying the pipeline to both (1) the set of known fraud cases; and (2) the set of unknown unknowns (the set of everything else) and analyzing the information in those results, an understanding is gained regarding how well the detector performs and the quality of existing detectors. This also provides an understanding of the number of additional detectors that may need to be constructed to increase detection ability. For example, searching through 1000 cases may identify 20 detected behaviors, but there may still be other behaviors that exist in the remaining 980 cases that the 20 detectors were not designed to catch. This can inform of the need to construct additional detectors.

Furthermore, applying the pipeline to both (1) the set of known fraud cases; and (2) the set of unknown unknowns (the set of everything else) also provides an understanding of how the false positive rules engine performs, and whether additional false positive rules need to be constructed to reduce the number of false positives. This is important because there can be a huge number of different false positive rules that can be constructed and based on information from a wide variety of sources.

For example, false positive rules can be obtained from internal data sources in order to identify "small apartment size", "is customer a solar customer", and so forth; false positive rules can also be determined by external data sources such as Facebook, Twitter, LinkedIn, Glassdoor, or even the news media. For instance, a LinkedIn profile may indicate that customer X has requisite engineering knowledge to commit electricity fraud, and therefore if abnormal behavior is being detected the probability that the behavior is fraudulent may be increased relative to someone who would not be expected to have that knowledge. Similarly, Twitter follows, YouTube/Facebook comments, and group associations can be monitored and information can be captured about what topics the person is engaged in (sharing, liking, or commenting on). This technology can be obtained by stringing together various open source tools and APIs, or through software such as Oracle Marketing Cloud.

Furthermore, data from these various data sources (e.g., internal sources (internal customer data) and external sources (social media)) used to create false positive rules can be fed into a graph database in order to automatically, and quickly, identify communities and complex relationships. For example, the graph database could inform that people who engaged in fraud liked "X, Y, Z" and talked about "A, B, C". The graph database would then return everyone who had similar features but who has yet to engage in fraud. Thus, the false positive rules engine can be constructed using inferences and knowledge that result from a graph database. Similar uses of graph databases are allowing police departments across the world to track negative sentiment against important political figures and the activities of protest groups (e.g., to plan for crowd control, barricades, etc.), and also allowing the detection of credit card fraud.

This allows the false positive rules engine to evolve into a personalized fraud system, such that data from the demand profile is married with data from social media indicating relationships/degree of relationships to known fraudsters in terms of mathematical and physical geographic spaces. These data points can serve to build a 360 view of the customer profile. For example, a customer's interest in things related to green energy (or social media posts to that effect) could be a direct indicator that a sudden decrease in demand resulted from a shift in change and preferences (e.g., the customer is going green to save the environment) rather than an intention to commit fraud. Without a social media listening method, this data would not be captured and taken into account by a false positive rules engine to explain away a legitimate decrease in demand.

Accordingly, the electricity fraud detection system described herein can be based on a paradigm of fraud prevention, rather than fraud reaction, that allows the prevention of fraud from occurring in the first place. A person who has not yet engaged in fraud, but whom the graph database has identified, may be dissuaded or deterred from engaging in fraud simply by getting hit with a targeted mailing campaign, or a text message, highlighting the firm's ability to detect fraud. In other words, once a predictive model identifies who is likely to engage in fraud, some type of outreach campaign can be employed to prevent the event from occurring. The success of these campaigns can be tracked by simply monitoring who received the outreach treatment and still ended up committing fraud. The purpose of such an outreach campaign is to perform some type of behavior modification—e.g., preventing someone from doing something (do not commit fraud). This is similar in ideology to the "conversion funnel" in marketing, in which customers move through a series of phases when making a purchase: awareness, intent, and then finally a decision to purchase. At the same time, the reactive version of the electricity fraud detection system in this application would handle the identification of customers who passed through all the stages in the "conversion funnel" and reached a "conversion", e.g., they actually engaged in fraud.

Thus, the preventative, pre-fraud version of the system would identify and deal with everyone who has entered the conversion funnel but who has not yet converted (e.g., fraud has not yet occurred), and the reactive version of the fraud detection system would deal with everyone who is post-conversion (e.g., the people who have committed fraud). These systems could be connected together to create a true-combined arms approach in the areas of fraud prevention and fraud reaction. So regardless of where a customer is in the conversion funnel, there would be a mathematically concrete/rigorous way to deal with them.

With regards to the detectors used in the electricity fraud detection system, the detectors are deliberately decoupled from the false positive rules engine by design since a false positive rules engine may be applicable to multiple detectors, or specific to only one detector. The numerical accuracy of these combination of detectors and false positive rules engine can be verified by storing the output. This allows us the detectors and the false positive rules engine to be continuously refined. Furthermore, this framework allows for root cause analysis to be performed quickly and efficiently. There is no guess work on how a detector arrived at its conclusion (the detectors are defined in advance) or what caused a false positive (it is a rule that was not included in the false positive rules engine). Thus, any defect in either the detector/false positive rules engine can be quickly identified and fixed.

The detectors and false positive rules may be constructed by human experts, AI, or both. For example, automatic false positive rules may be constructed via the application of machine learning association rules/unsupervised learning. In another approach, the false positives may be identified using the previously described traversing of the graphs to leverage social media and internal data. These two separate approaches can even be combined into a single two-pronged approach, with false positive rules that human experts know but are implemented through machine learning algorithms (e.g., using inferences that rely upon business knowledge not captured in the data). This ecosystem performance monitoring framework allows for continuous improvement of the electricity fraud detection system by allowing users to change what is not working without impacting what is working, and allows users to gain a better understanding of why certain parameters may be working work so well in the first place.

Example Embodiments

FIG. 1 illustrates a system diagram for electricity fraud detection in accordance with embodiments of the present disclosure.

In some embodiments, there may be one or more customers 102-1 through 102-n, such as the customers of an electric utility company that have electrical power delivered to their residence. As each customer uses electricity, their electrical usage may be measured at respective meters 104-1 through 104-n. In some embodiments, the meters may be associated with distinctive identifiers (e.g., a service point id), and each customer's residence/property may be associated with a meter. Accordingly, the distinctive identifier for a meter may be also used to identify the associated customer.

The meters 104-1 through 104-n may report electricity usage statistics, among other information, to the electricity fraud detection (EFD) system 110. The electricity usage for the various customers 102-1 through 102-n may be stored in a demand database 112. In some embodiments, there may be an observed fraud database 114 that contains data items associated with previously observed cases of fraudulent activity, such as a customer stealing electricity without paying for it. In some embodiments, these observed cases of fraud may be used to help provide feedback and verify the results of the electricity fraud detection system 110.

In some embodiments, the electricity fraud detection system 110 may be able to detect fraudulent activity of one or more customers 102-1 through 102-n. This can be done through various methods, including the determination of a behavioral profile for each of the customers 102-1 through 102-n based on their electricity usage, as will be discussed herein. In some embodiments, once the electricity fraud detection system 110 identifies or detects fraudulent activity being performed by one or more customers 102-1 through 102-n, the electricity fraud detection system 110 may notify an investigator 122 through a computing device 120. The investigator 122 may then perform an investigation of any fraudulent activity being performed by the customers in order to verify fraud is occurring.

Figure 2A:
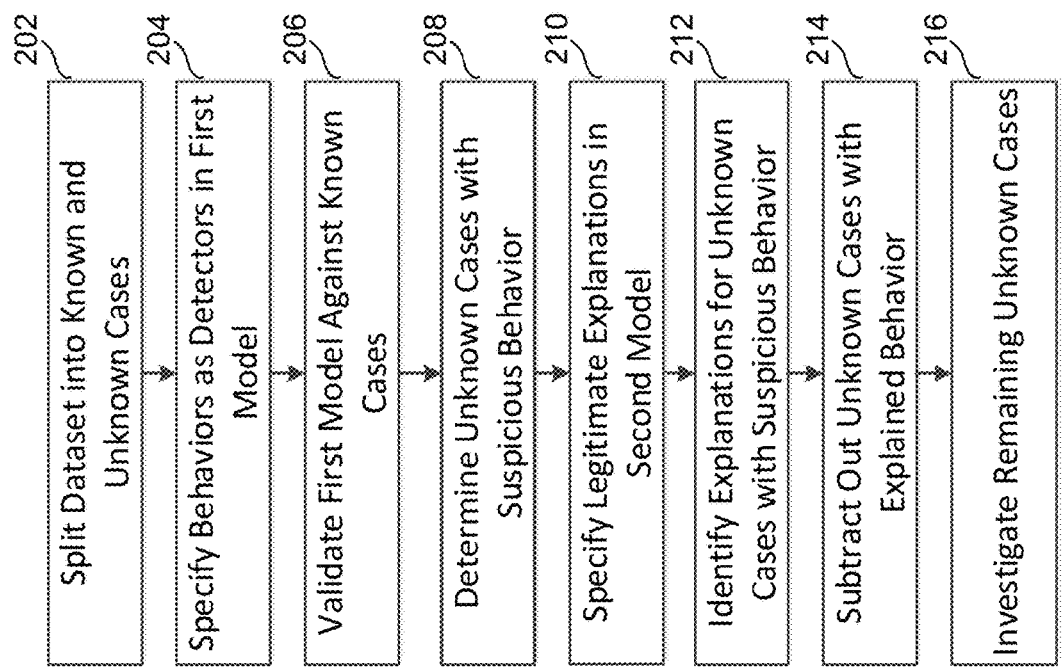
FIG. 2A illustrates a block diagram for an algorithm directed to detecting electricity fraud in accordance with embodiments of the present disclosure.
Figure 2B:
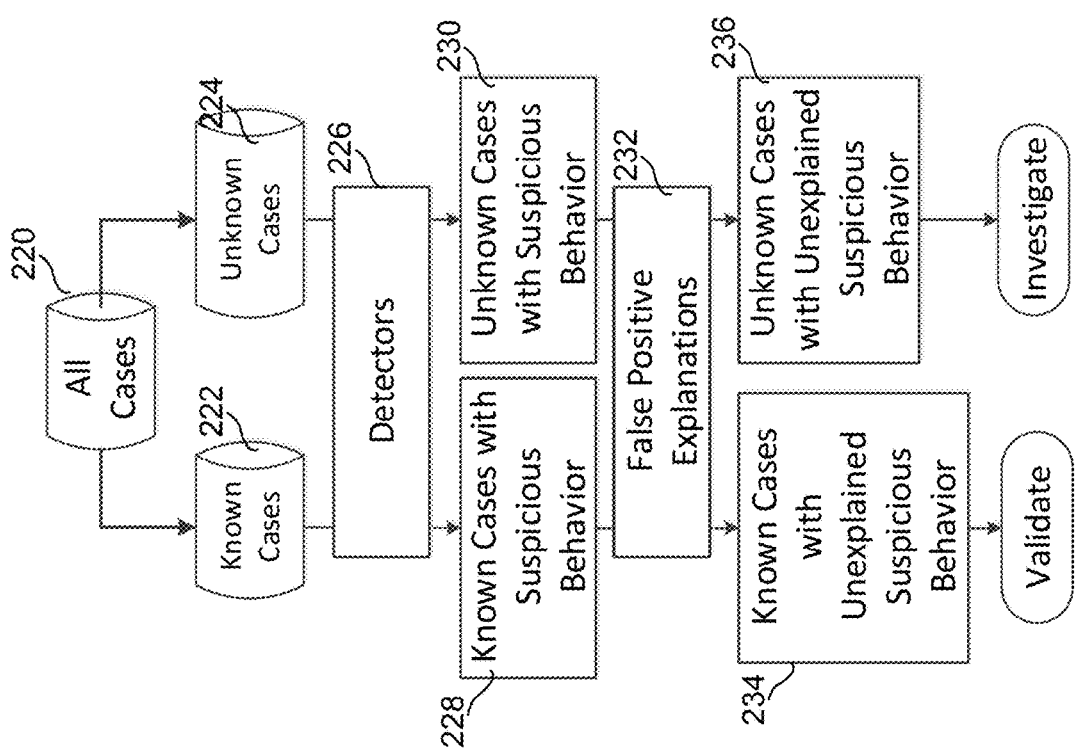
FIG. 2B illustrates a block diagram for an algorithm directed to detecting electricity fraud in accordance with embodiments of the present disclosure.

FIG. 2A illustrates a block diagram for an algorithm directed to detecting electricity fraud in accordance with embodiments of the present disclosure. FIG. 2B also illustrates a block diagram for an algorithm directed to detecting electricity fraud in accordance with embodiments of the present disclosure. FIGS. 2A and 2B are described together.

At block 202, a dataset containing the demand data and fraud data for customers (e.g., a combination of the data tables shown in FIG. 3A and FIG. 3B) may be used to determine a set of known cases (previously observed, actual fraud) and the corresponding data items for those known cases (e.g., the demand data for the customers that committed that fraud). That dataset may also be used to determine a set of unknown cases and the corresponding data items for those unknown cases (e.g., all the data items for customers not involved in previously observed, actual fraud). As a more specific example, a dataset of all cases 220 can be split into a dataset of the known cases 222 and a dataset of the unknown cases 224. The set of known cases may be useful in validating the accuracy of one, or both, of the models used in the electricity fraud detection system.

At block 204, a set of behaviors are specified as detectors (e.g., the detectors 226) in the first model for detecting suspicious behavior, which is designed to be over-inclusive of suspicious behavior in order to improve the fraud detection rate. As previously mentioned, the detectors may be based on behaviors associated with the demand profile or metrics associated with electricity usage over time, for each customer. These demand profiles can be calculated based on demand data, which can be gathered for all the customers through the meters 104-1 through 104-n shown in FIG. 1. For instance, a customer's daily electricity demand over the course of the year can be used to calculate a maximum demand, a minimum demand, and a median demand for that time period; those metrics can be considered as part of the customer's demand profile for that time period. Demand profiles are described in more detail in regards to FIG. 2A, FIG. 2B, and FIG. 6. Examples of graphs associated with demand profiles are shown in FIGS. 8A, 8B, 9A, and 9B.

A detector can be thought of as a pre-defined behavioral pattern associated with a demand profile that could result in lost revenue. The first model may be configured with multiple detectors, and therefore able to identify any customer demand profiles that fall under any pattern in a set of these pre-defined patterns. An example of a detector would be low median demand for a customer's demand profile, which can be defined in various ways. For instance, it could be defined as median demand always being zero and maximum demand always being zero, median demand being zero but maximum demand greater than zero, the median demand being within the bottom 10th percentile of median demands for all customers (e.g., at least 90% of the population of customers had a greater demand), and so forth. The implementation of a detector based on percentiles is described in further detail in regards to FIGS. 4A, 4B and 5. It should be noted that median may be useful for bypassing potential issues of skew, as a customer's daily demand can be a highly volatile process (e.g., varying wildly day-to-day) that can have outliers. Thus, additional detectors can be easily added to the model, which can be referred to as an "ecosystem" that is both robust and rigorous, since it can include numerous, highly-specialized independent detectors that each focus on a specific behavior associated with the demand profile. Furthermore, the use of detectors in this fashion avoids a reliance on patterns in past behavior (e.g., previously observed fraud) and no training is involved. Since no training of the detectors is involved and the detectors focus on behaviors, the same detectors can be used to detect industrial fraud as well as residential fraud (as patterns are not being applied that are specific to either case).

In some embodiments, other examples of potential suspicious behavioral patterns that can be incorporated into detectors include:
(1) a sudden decrease in demand, followed by the demand remaining low (shown in FIG. 13);
(2) a slow decrease in demand, followed by the demand remaining low (shown in FIG. 14);
(3) a slow decrease in demand over an extended period (shown in FIG. 15);
(4) very low demand (shown in FIG. 16);
(5) the demand not rising when it is expected to (shown in FIG. 17);
(6) the demand is too abnormally stable (shown in FIG. 18).

Figure 14:
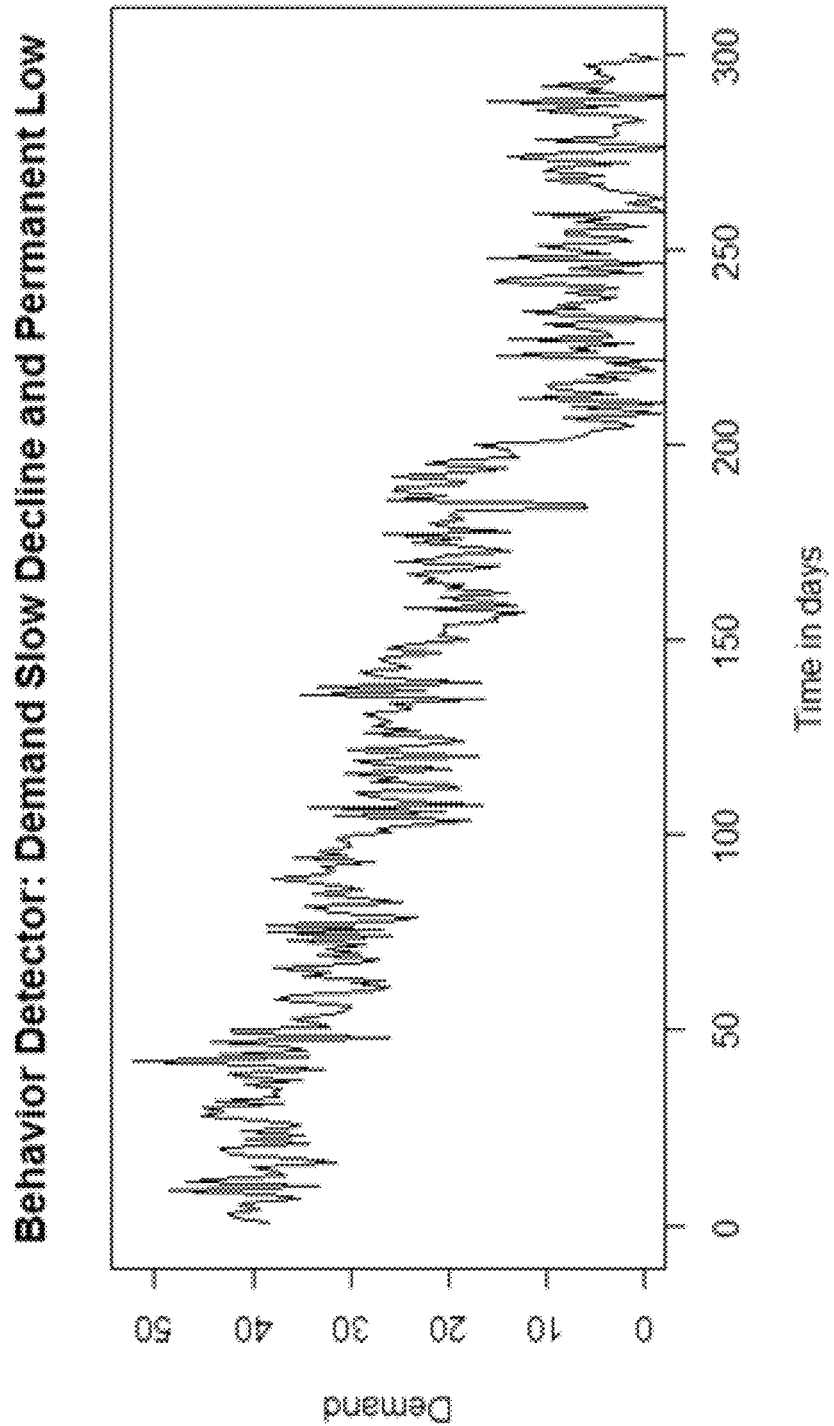
FIG. 14 illustrates an example behavioral pattern for a slow decrease in demand, followed by the demand remaining low, in accordance with embodiments of the present disclosure.
Figure 15:
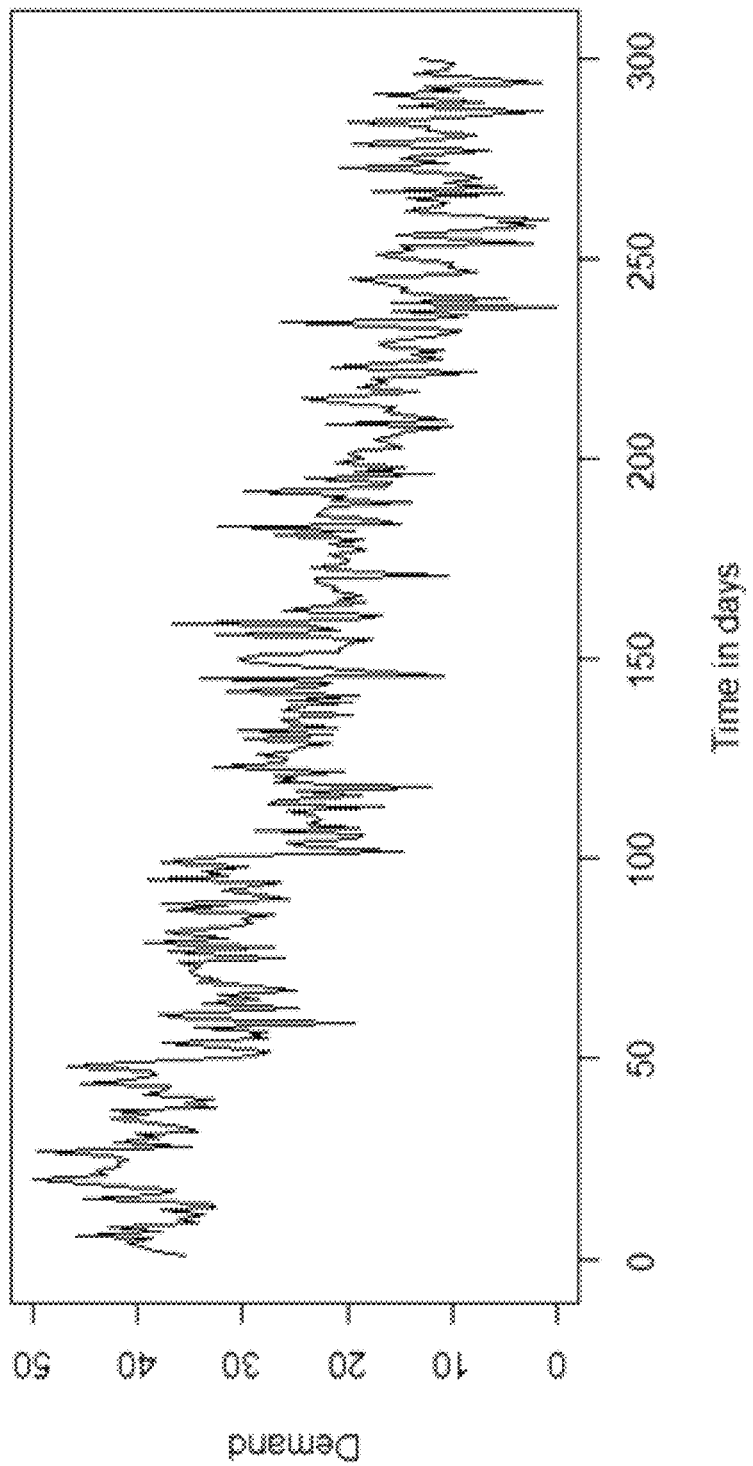
FIG. 15 illustrates an example behavioral pattern for a slow decrease in demand over an extended period, in accordance with embodiments of the present disclosure.
Figure 16:
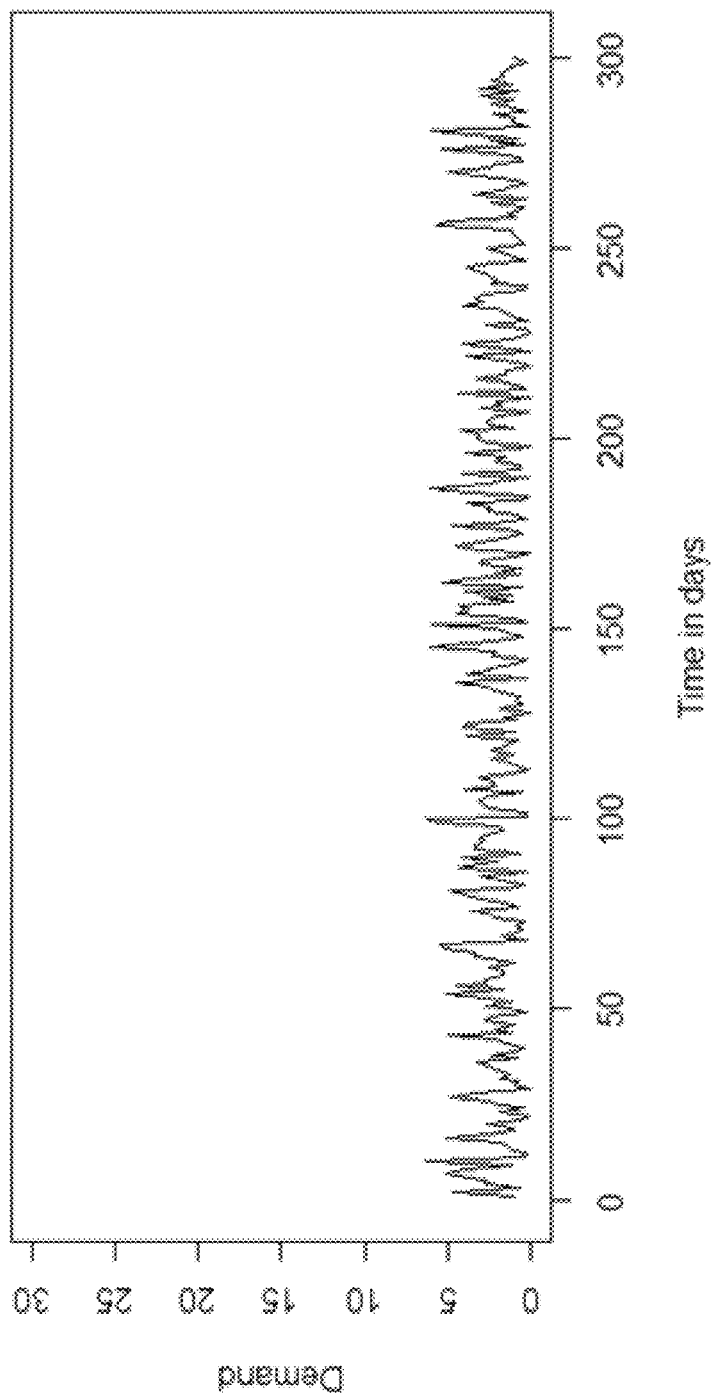
FIG. 16 illustrates an example behavioral pattern for very low demand, in accordance with embodiments of the present disclosure.

It should be noted that in FIGS. 13-18 and their corresponding descriptions, and especially in FIG. 16, low demand or very low demand can be defined by the distribution from the ECDF of the population of interest at a given point in time. For example, in FIG. 16, the ECDF of the population of interest is used to obtain a demand distribution (e.g., including a median demand). Low demand would be defined as the lower left hand tail of that distribution (e.g., a distribution of distributions) rather than an arbitrarily chosen threshold value for demand (e.g., 10 kwh). The exact amount of demand that qualifies as low demand will depend upon the time and population behavior at that time. For example, low demand could be 10 kwh or 100 kwh depending on the typical demand across the population. FIGS. 13-18 provide visualizations of customer demand profiles that can be classified into behavioral patterns. The data in those visualizations can be quantified using time dependent metrics, such as medians, max, mins, etc. Those would be inputs into the behavioral detectors to detect these types of patterns across time, relative to the metrics exhibited by everyone else.

At block 206, the detectors of the first model are validated against the set of known cases (e.g., the previously observed fraud cases) by determining the known cases with suspicious behavior. For example, if there are 38 cases of fraud in a one-year period, a demand profile for each customer involved in those 38 cases of fraud can be generated and the detectors of the first model can be applied to those demand profiles. As a more specific example, say the first model includes a set of detectors based on low median demand (e.g., median demand being zero and maximum demand being zero, median demand being zero but maximum demand greater than zero, the median demand being within the bottom 10th percentile of median demands for all customers) and 15 of the 38 demand profiles are identified as suspicious by the first model. This means that this limited set of detectors caught approximately 40% of the known fraud cases. This accuracy can be further improved by adding additional, independent detectors to the model.

At block 208, the detectors of the first model may be applied to the unknown cases (e.g., all the other customers not in the set of known fraud cases—there may be many, representing the vast majority of customers) in order to determine unknown cases with suspicious behavior. This may involve determining a demand profile for each customer and applying the set of detectors against each of the demand profiles to see if any of the demand profiles are flagged for suspicious behavior. For example, from data corresponding to over 400,000 customers representing the unknown cases, there could be over 34,000 cases of suspicious behavior that are identified. These cases would be mutually exclusive from the set of previously known and verified fraud cases, and the relatively large number of these cases suggests that there are most likely occurrences of fraud (if even just a small percentage of these suspicious cases are fraudulent) that were not detected using traditional methods.

Thus, as seen in FIG. 2B, the detectors 226 can be separately applied to both the known cases 222 and the unknown cases 224. The detectors 226 can be applied to the known cases 222 for model validation purposes, in order to determine known cases with suspicious behavior 228. In other words, the known cases 222 can be used to check if the detectors 226 are correctly identifying most or all of the known cases 222 as suspicious behavior. The detectors 226 can also be put into use and applied to the unknown cases 224 in order to identify customer accounts or unknown cases associated with suspicious behavior 230.

At block 210, legitimate explanations for suspicious behavior may be specified in a second model, which may alternatively be referred to as a false positive rules engine. It is the job of the second model to solve the problem of a high false positive rate in electricity fraud detection by using legitimate explanations of why suspicious behaviors occurred in order to rule them out as suspicious. Possible legitimate explanations for suspicious behavior may include: (1) the customer is a user of solar panels, which decreases their demand; (2) there was equipment failure; (3) there was a storm; (4) there was a grid overload without a storm; (5) the electric utility got shut off by the electric utility company or by the request of user; (6) there was a change in tastes & preferences for the customer's demand; (7) there was a change in population in residence; (8) there were marketing campaigns or changes in billing periods; or (8) the customer used a generator to save money during peak hours.

At block 212, the second model may be applied to the unknown cases with suspicious behavior in order to see if any of those unknown cases can be explained using any of the legitimate explanations specified at block 210. If no possible legitimate explanation of a suspicious behavior for a service point can be found, then that service point may be a candidate for potential fraudulent activity. In some cases, the false positive explanations 232 can be applied to both the known cases with suspicious behavior 228 and the unknown cases with suspicious behavior 230. This would result in a set of known cases with unexplained suspicious behavior 234 (which can be further used to validate the second model in erroneously determining actual, verified fraud to be legitimate behavior) and a set of unknown cases with unexplained suspicious behavior 236 for further investigation. Accordingly, at block 214, the unknown cases that were identified to have legitimate explanations for their suspicious behavior can be subtracted from the total list of unknown cases with suspicious behavior (determined at block 208). The remaining unknown cases are the cases with suspicious behavior that cannot be explained by any legitimate explanation, and are thus highly likely to be fraudulent. At block 216, any remaining unknown cases with unexplained suspicious behavior can be further investigated to verify fraud. In some cases, this may involve notifying an investigator to go out to confirm the fraud is occurring, such as by having the electricity fraud detection system 110 send a notification to the computing device 120 to inform the investigator 122 of which service points to go out and investigate.

FIG. 3A illustrates an example of demand data usable for electricity fraud detection in accordance with embodiments of the present disclosure. FIG. 3B illustrates an example of fraud data usable for electricity fraud detection in accordance with embodiments of the present disclosure.

Both of the figures show only a limited portion of what the data tables would look like in actuality. In practice, the data tables may contain hundreds of thousands or even millions of entries. The size of the data tables may increase geometrically as the number of customers increases and their daily demand is tracked over longer and longer periods of time. In some cases, the total size of the data may exceed gigabytes or terabytes of data, and it would be impossible for a human being to utilize all of the data to make mental calculations or pen-and-paper computations. Thus, systems and methods of the present disclosure enable data-driven analysis of a tremendous amount of data in order identify numerous cases of potential fraud that would not be identifiable using traditional methods.

Both of the figures show values in scientific notation. This is for example purposes only, and in practice, the data tables may store values in any type of format. In some embodiments, processing the data in the data tables may involve reading the data and cleaning the data. Cleaning the data may involve converting values to a different format, such as converting values to be displayed in scientific notation, or converting the service date to a month/day/year format.

With regards to FIG. 3A, the figure illustrates a data table in raw form that contains demand data associated with a plurality of electric utility customers. In some embodiments, there may be daily demand data for each customer, such that the electricity demand used each day by a customer is known. In some embodiments, the data table may include rows of data items that are sorted by columns, such as the columns 302, 304, 306, 308, 310, 312, 314, and 316. Other data pertaining to the electricity utility customers that are not shown in the figure may also be included in the data table.

In some embodiments, the column 302 (shown with the heading "sp_id") may be the service point id, which corresponds to a distinct identification number of a service point. A service point may be an electricity meter for a specific customer. Accordingly, the service point id may be used to identify specific customers. For instance, in a data table that includes 400,000 customers, there may be 400,000 unique service point ids. However, it should be noted that there could be more than 400,000 rows in the data table, since each customer may have a row of data for each service date tracked. For instance, a customer that had data for 100 service dates would be associated with 100 rows of data in the data table that all have that customer's service point id. Furthermore, if a customer has multiple addresses receiving electricity service, then there could multiple service points belonging to that customer. This is useful because a customer with multiple addresses that is committing fraud on one property is highly likely to be committing fraud on their other properties.

In some embodiments, the column 304 (shown with the heading "demand") may be a customer's demand or electricity usage for a specific service date. This demand can be measured in any suitable unit or metric. In some of such embodiments, this demand may be measured in kilowatt-hours (kWh). For example, a demand value of "4.1" in a row of data may signify that the specific customer for that row used 4.1 kWh on that specific service date (denoted in column 306). Accordingly, the demand values shown in the data table may correspond to a daily usage. However, in other embodiments, the demand values do not necessarily have a day-by-day resolution. For example, demand values can be tracked hour-by-hour, minute-by-minute, week-by-week, and so forth.

In some embodiments, the column 306 (shown with the heading "service_date") may be a service date in day, month, year format. For example, a value of "01032017" may correspond to Jan. 3, 2017. However, any other suitable format may be used for referring to specific service dates, including but not limited to, year/month/day format, month/day/year format, and so forth. In the previous example, a row of data having the demand value of "4.1" and a service date of "01032017" would indicate that the customer associated with the service point id of that row utilized 4.1 kWh on Jan. 3, 2017.

In some embodiments, the service date may be further parsed or broken into specific quarters, months, week numbers, and specific days of the week. For example, during the data cleaning process, the year of service date can be determined and displayed in column 308 (shown with the heading "yr"). The quarter of the service date can be determined and displayed in column 310 (shown with the heading "qt"). The month of the service date can be determined and displayed in column 312 (shown with the heading "mn"). The week number of the service date can be determined and displayed in column 314 (shown with the heading "wd"). The day of the week of the service date can be determined and displayed in column 316 (shown with the heading "day"); for instance, if the service date is a Sunday then the value in column 316 can be '1', or if the service date is a Saturday then the value in column 316 can be '7'.

With regards to FIG. 3B, the figure illustrates a data table in raw form that contains fraud data associated with a plurality of electric utility customers. In some embodiments, the data table may include rows of data items that are sorted by columns, such as the columns 320, 322, and 324. Accordingly, each row of data in this data table may pertain to a case of fraud (e.g., electricity theft). Other data pertaining to the incidences of fraud that are not shown in the figure may also be included in the data table.

In some embodiments, the column 320 (shown with the heading "fraud_date") may be the service date for which an incidence of fraud was detected. In some embodiments, the format of values in column 320 may be the same format as the service date values shown in column 306 (e.g., day, month, year format). For example, a value of "01032017" may correspond to Jan. 3, 2017 as the service date on which fraud was detected for the specific customer indicated in the data row. However, as previously mentioned, any other suitable format may be used for referring to specific service dates.

In some embodiments, the column 322 (shown with the heading "total") may be the total dollar amount associated with the fraud. In other words, the column 322 may indicate how much money the fraud cost the electric utility company based on the amount of electricity that was stolen.

In some embodiments, the column 324 (shown with the heading "sp_id") may be the service point id of the service point at which the fraud was detected. In other words, this service point id may correspond to a specific customer. These values in column 324 may be used to join the fraud data (e.g., the table of FIG. 3B) with the demand data (e.g., the table of FIG. 3A) of the customers, which also have service point ids (e.g., column 302). For example, for a row of data in the data table of FIG. 3B, which corresponds to an incidence of detected fraud, there is an indicated service point id (e.g., '1234567'). That service point id can be looked up in the corresponding demand data (e.g., FIG. 3A) in order to find all the daily demand data for that service point id, for any available service dates. This query could be further narrowed, for example, to find the daily demand data in the year 2015 for that service point id; there would be as many as 365 rows of demand data that fit that criteria.

FIG. 4A illustrates an example distribution table usable for electricity fraud detection in accordance with embodiments of the present disclosure.

As previously mentioned, various detectors can be used for identifying suspicious behavior from customer demand profiles. One example of a detector that was mentioned involved a behavioral pattern in which the median demand for the customer over the period of time is within the bottom 10th percentile of median demands across all customers (e.g., at least 90% of the population of customers had a greater median demand). There may be several advantages associated with defining a detector using a quantile rather than a static value. For instance, the values associated with the 10th percentile, median, 90th percentile, and so forth, may change over time. The entire population of customers may use additional electricity during the winter months (for heating) or the summer months (for cooling), and so forth. So there may be seasonality and trends for demand at the population level. A customer with median demand of 10 kWh could be considered as low demand or high demand depending on the changing demand of other customers in the population. However, the 10th percentile of any distribution may be a rare event as that is the mathematical definition for it (e.g., it occurs less than 10% of the time). Therefore, regardless of how the overall demand may change at the population level, a customer exhibiting demand below the 10th percentile of population demand would always be considered as having low demand since 90% of the population has greater demand.

In other words, defining a detector with a threshold value of '10 kWh' may affect whether a specific customer has a demand below the threshold depending on the day, the season, or the specified time period. Alternatively, the use of detectors based in percentiles means that a customer's demand profile is necessarily compared against the demand profiles of all the other customers, and each customer's behavior can be determined as low demand or rare relative to everybody else. For example, if everyone's usage was increasing, but there is one specific customer that does not have increasing demand whose account was not turned off, it would be possible for that customer to be stealing electricity by having a regulator that makes their reported electricity usage flat.

In the previous example, the 10th percentile was chosen as a threshold for what behavior would be considered rare in a population. However, any other thresholds may be used (e.g., median demand under the 15th percentile may be considered low). The lower the threshold, the rarer the behavior may be exhibited in the population. For example, there would be less customers with median demand under the 5th percentile than customers with median demand under the 10th percentile, and the customers with median demand under the 5th percentile may be more likely to commit fraud. However, setting the threshold too low may result in finding only a small amount of customers (or none) with behavior within that threshold. For example, if the threshold is set at the 1 percentile, there could be zero customers that have median demand below the 1 percentile. Setting the threshold higher, such as at the 10th percentile, ensures that there are enough customers identified by the model. Thus, there may be a tradeoff when it comes to setting the threshold; the tradeoff is between identifying a fewer number of potentially fraudulent customers (and potentially identifying too few customers), or identifying more potentially fraudulent customers at the expense of the false positive rate increasing.

In some embodiments, there may be an algorithm configured to automatically set the threshold and balance these various considerations. In some embodiments, the algorithm may be configured to set the threshold based on a minimum number of customers to be identified as having suspicious behavior using the detectors. In other words, the algorithm may select the percentile that will yield a selected minimum number of customers with suspicious behavior. For example, it could be specified that there should be a minimum of 20 customers identified to have suspicious behavior based on their median demand being below a threshold. Based on the distribution of the demand profiles for the entire population of the customers, the algorithm can set the threshold such that at least 20 customers are identified with median demand below that threshold. This can be useful from a fraud investigation perspective, since there may be a limit on how many of the identified potentially-fraudulent customers can be investigated. For instance, the investigator 122 in FIG. 1 may only have the resources available to visit 12 customers. Configuring the algorithm to set the threshold to identify 20 customers with suspicious behavior may result in an even smaller list of customers with unexplained suspicious behavior (e.g., if 8 of those identified customers are solar users there would be 12 customers remaining with unexplained suspicious behavior). However, this smaller list of customers with unexplained suspicious behavior could all be potentially investigated by the investigator 122. Thus, the algorithm can be used to tailor the numbers of identified customers with suspicious behavior and the numbers of identified customers with unexplained suspicious behavior in accordance with the resources or availability of the investigator 122.

It should be noted that in order to implement detectors defined using percentiles, the distributions of the customer demand profiles has to be determined in order to allow a customer's behavior to be ranked relative to everyone else. This can be done by computing and plotting the quantile distribution and the empirical cumulative distribution function (ECDF) for the demand profiles of all of the customers in a set.

For instance, with reference to FIG. 4A, a distribution table (illustrating the quantile distribution) is shown for the median demand of each customer in a set of 38 fraudulent customers in a time period (e.g., over the course of a year). The distribution table illustrated in the figure depicts how the median demand (or any other aspect of a demand profile) for each customer can be bucketed into different percentile ranges.

The corresponding data for those 38 fraud cases would be stored in a data table similar to that shown in FIG. 3B. The service point ids for those 38 fraud cases can be used to query the demand data associated with those service points over the course of that year (e.g., demand data in the year 2015). Thus, the daily demand for each day of the year 2015 would be identified for each of those 38 service point ids. For each service point id, the daily demand over the time period can be further used in order to calculate a behavioral profile associated with that service point id. For instance, each service point id would be associated with a number of days the account was active, the median demand for the time period, the maximum demand for the time period, the minimum demand for the time period, and so forth. In other words, for a service point id of '1234567', it could be determined that the account has been active for 500 days, had a median demand of 4 kWh over that year, a minimum demand of 0 kWh over that year, and a maximum demand of 20 kWh over that year.

With reference back to FIG. 4A, the fraud cases can be sorted and ordered based on a metric of their demand profile. For instance, all 38 fraud cases can be ordered from least-to-greatest based on the median demand associated with each of the corresponding 38 service point ids. Any metric could be used, such as minimum demand or maximum demand, but the figure is based on median demand for exemplary purposes. The median demand corresponding to all of the fraud cases make up a distribution, which can be used to place the fraud cases into various buckets based on where the median demand for each fraud case lies in the distribution. The resulting placement of the fraud cases into the various buckets is then reported in the data table shown in FIG. 4A, which is shown as having numerous rows sorted by columns 402, 404, and 406.

In some embodiments, the column 402 (shown with the heading "quantile") may be used to indicate a certain bucket of the distribution, which in some cases may be a quantile for the distribution. For example, row 'a' of the data table has a value of '0' under column 402, and the row 'b' of the data table has a value of "1" under column 402. Thus, row 'b' of the data table may pertain to the fraud cases having a median demand between the '0' and '1'st quantile of the median demands. The last row, having the value of '100' under column 402, would indicate the number of fraud cases having a median demand between the '75'th (the value of the previous row) and '100'th quantile of the median demands.

In some embodiments, the column 404 (shown with the heading "med_demand") may show the median demand associated with a specific quantile. For example, row 'f' of the data table has a value of zero under column 404, which would indicate that the median demand of the fraud cases is zero in the 20th percentile bucket. As previously mentioned, any suitable metric from the behavioral profiles can be used in place of median demand, including minimum demand, maximum demand, and so forth.

In some embodiments, the column 406 (shown with the heading "num") may show the number of observations that are in the bucket indicated by the row of the table. Thus, in the example data table, there are 19 observations within the 20th percentile bucket of median demand, which is determined to be zero. 9 of the 38 observations of fraud fall within the 75th percentile bucket of median demand, which is determined to have a value of 34.5145.

Figure 4B:
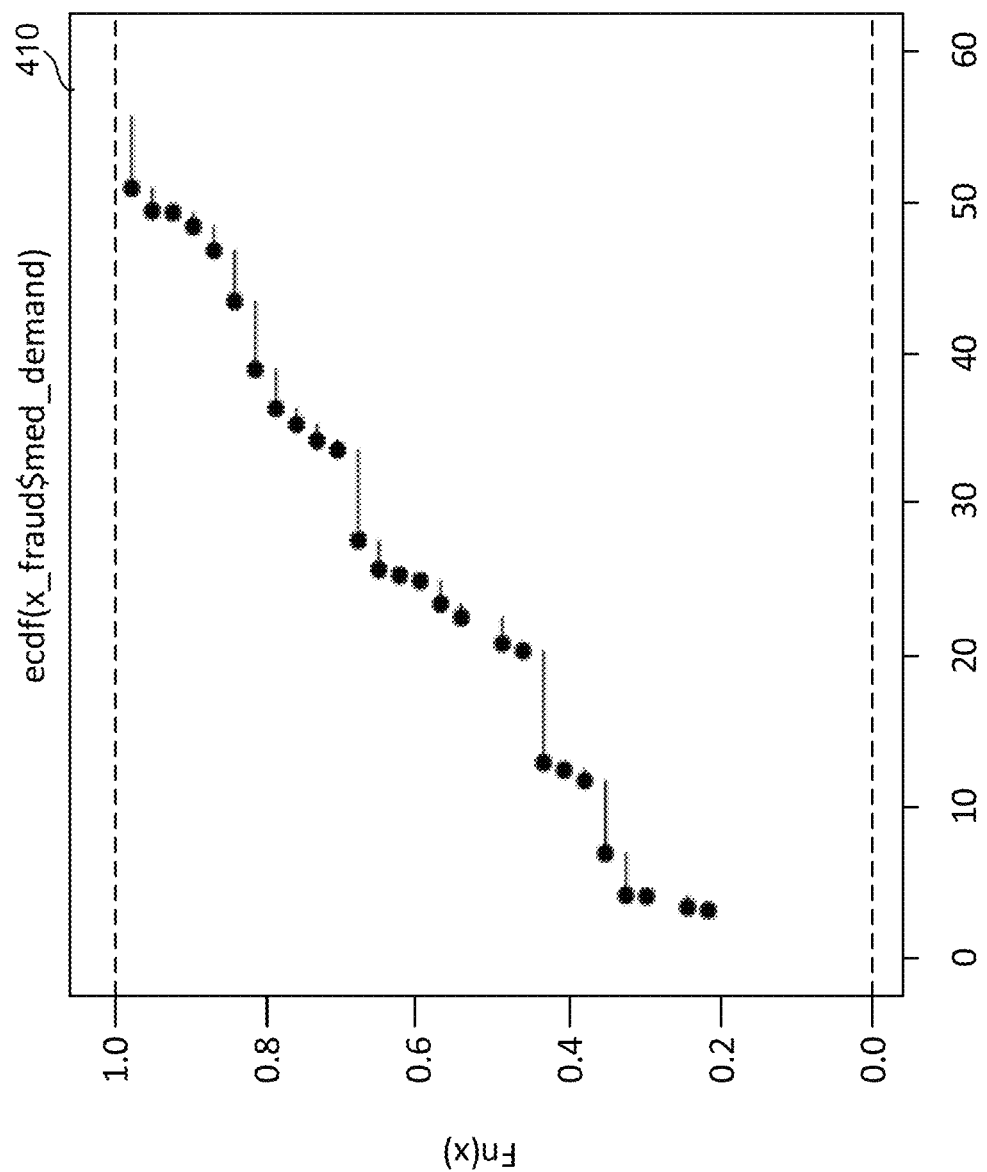
FIG. 4B illustrates an example distribution plot usable for electricity fraud detection in accordance with embodiments of the present disclosure.

FIG. 4B illustrates an example distribution plot usable for electricity fraud detection in accordance with embodiments of the present disclosure. More specifically, the figure shows an example plot of an empirical cumulative distribution function (ECDF) corresponding to the median demands for the 38 fraudulent customers from FIG. 4A. Both the ECDF of FIG. 4B and the distribution table of FIG. 4A range from 0% to 100%, with 100% denoting all of the observations.

The ECDF of FIG. 4B is based on automatically computing the cumulative distribution function for the fraud cases, and it displays how each data point (e.g., the median demand for a customer) falls relative to all the other data points (e.g., how that median demand compares to the median demand from all the other observations). This is useful for ranking observations. It should be noted that the distribution of each customer is changing over time and that demand is seasonal, which means it could change in the winter, summer, and so forth.

Thus, with just the ECDF, a customer's demand profile can be compared against the demand profiles of the rest of the population in a single view. As previously described, this is useful because the definition of a rare event may change over time (e.g., a rare event in the summer may be a common event in the winter, and vice versa). In comparison, a machine learning algorithm would not be able to take these changes into account because it can only memorize past patterns to project them into the future. Furthermore, people change their behavior when they are monitored which results in a change in the distribution that machine learning algorithms cannot account for.

The ECDF is also useful for ranking characteristics of a customer's electricity usage. From the ECDF, it can be determined how the demand profiles of customers rank relative to one another and how those distributions change over time. Changes in the ECDF for various metrics of customer demand profiles can be viewed, for example, to see how the behavior of the entire population of customers changed from December to January. Tracking the behaviors of the entire customer population and considering each customer's behavior against the typical behavior of the population can allow for increased detection of fraud due to the variety of ways that fraud can be committed. Not all fraud cases involve a scenario in which the customer circumvents or turns off the metering of their electricity usage, such that their reported usage is zero. Instead, a customer could use a regulator in order to prevent a decrease in reported demand, but the customer could be actually using more electricity than reported. In this case, it would be difficult to detect fraud from just viewing that customer's demand profile. That customer's demand profile would have to be compared to the demand profiles of other customers in order to determine that customer's demand should have increased, but did not due to fraudulent activity. In this manner, embodiments of the present disclosure are able to take into account behavioral changes in customers (e.g., the customer in the previous example starting to use a regulator) and detect those behavioral changes. These behavioral changes are quite common in fraud, which is why machine learning models are not that accurate to begin with and frequently need to have their models updated.

To summarize, defining a detector based on percentile means that a rare event is not specified in advance but rather derived from the demand profiles across the population. For instance, it may be determined that a median demand under the 10th percentile corresponds to a median demand of under 10 kWh, which would be lower than 90% of the population.

Figure 5:
FIG. 5 illustrates an example distribution table usable for electricity fraud detection in accordance with embodiments of the present disclosure.

FIG. 5 illustrates an example distribution table usable for electricity fraud detection in accordance with embodiments of the present disclosure.

More specifically, an example distribution table 500 is shown for a set of 406,388 customers (e.g., a set of unknowns), in which 34,719 demand profiles were identified has having the same behavioral characteristics as known fraud cases using the detector of median demand being less than the 10th percentile of the population, which in this case corresponds to a median demand of less than 10 kWH. It should be noted that adding up all the numbers in table 500 results in approximately ~38,000 profiles (different from the ~34,000 profiles), which can be explained by some of the accounts being inactive and the detector not distinguishing between active and inactive accounts—that is the job of the FP rules engine.

In this scenario, it can be seen in row 'c' that there are 18,982 demand profiles that had a median demand that was lower than 98% of the population. It can also be seen from row 'b' that there are no demand profiles in the 1st percentile of the population, as that bucket has been skipped entirely.

Figure 6B:
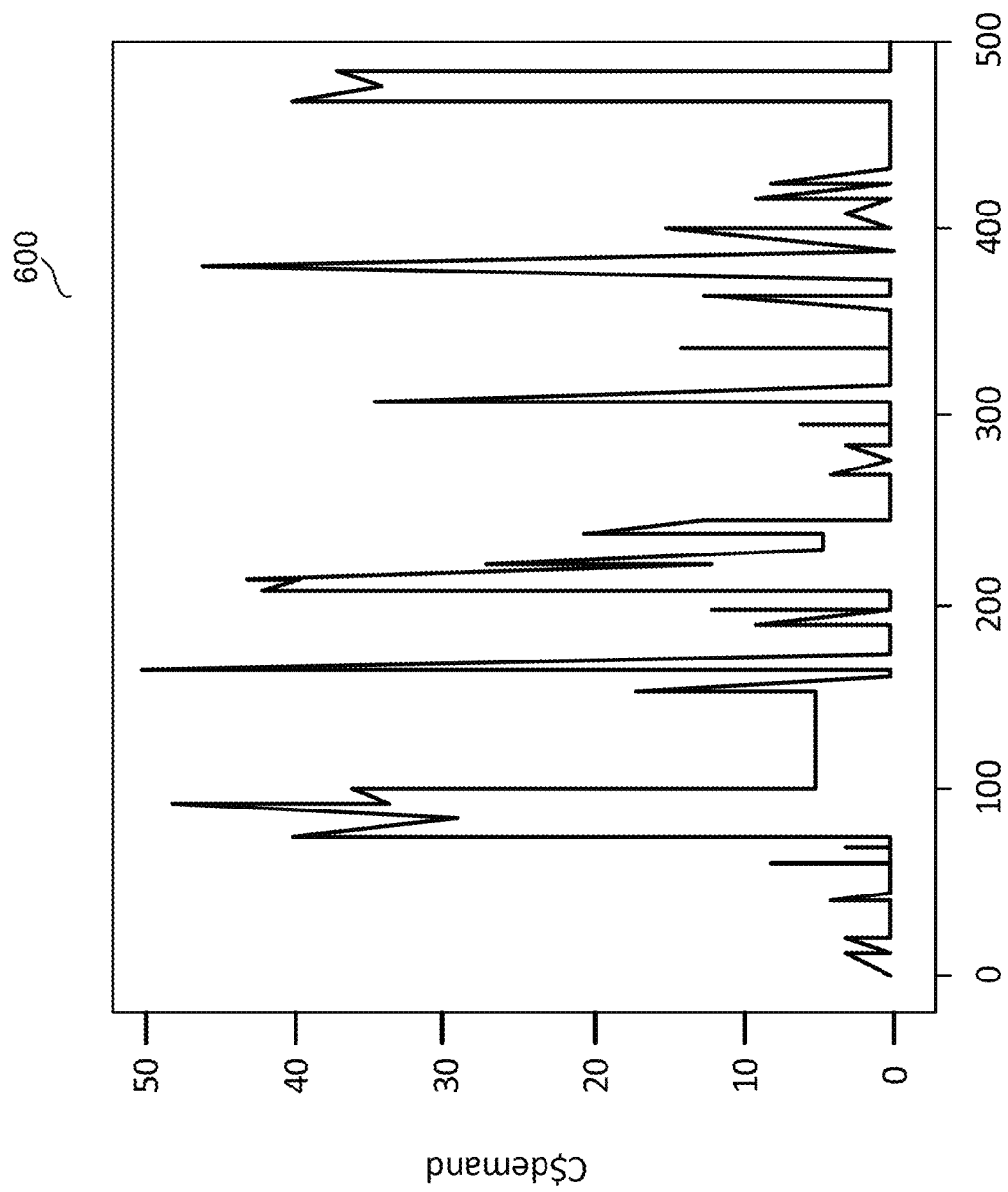
FIG. 6B illustrates an example graph of a customer's demand in accordance with embodiments of the present disclosure.

FIG. 6A illustrates an example demand profile of a customer in accordance with embodiments of the present disclosure. FIG. 6B illustrates an example graph of a customer's demand in accordance with embodiments of the present disclosure.

As shown in FIG. 6B, the graph 600 is based on a customer's demand data and shows the customer's demand, or electricity usage, in kilowatt-Hours (kWh) on a day-by-day basis for a period of over 500 days. Since a customer's demand can vary a great deal day-by-day, that variability can be seen in the graph.

This demand data can be used to calculate numerous metrics included in the customer's demand profile. For example, this specific customer's demand profile may be defined by a minimum demand of 0 kWh over that time period, a median demand of 1 kWh over that time period, a maximum demand of 54 kWh over that time period, a mean demand of 6.704 kWh over that time period, a first quartile demand of 0 kWh over that time period, and a third quartile demand of 5 kWh over that time period. These values are reflected in the customer's demand profile shown in FIG. 6A. It can be seen that large spikes in the customer's demand profile can skew the mean demand, so in practice, using a metric like median may be useful for bypassing potential issues of skew.

Accordingly, this generation of a demand profile can be looped and performed for every customer in a set using the demand data for that customer. The number of days each customer was active can be calculated, along with their median demand, their maximum demand, their minimum demand, and so forth, over the time period specified.

FIG. 7 illustrates an example results table in accordance with embodiments of the present disclosure.

The results table 700 can be used to validate the models used in detecting electricity fraud, such as by applying the detectors to known fraud cases in order to determine which of the known fraud cases were identified by the detectors. For example, consider the scenario in which a set of three detectors (median and max demand is always zero, median demand is zero but max demand is greater than zero, and median demand is between zero and the 10th percentile) is used to identify demand profiles associated with low demand. These detectors can be applied to a set of 123 known fraud cases in order to see how many of those known cases exhibited the suspicious behavior for the detectors. The detectors can also be applied to a set of 406,388 customers in order to see how many of those unknown cases exhibited the suspicious behavior for the detectors; in a previous example, it was mentioned that there were 34,719 demand profiles that exhibited the same behavioral characteristics of the known fraud cases. Accordingly, in the results table 700, the columns 702, 704, and 706 may correspond to the number of the 123 known fraud cases detected using one of the three detectors. The columns 708, 712, and 712 may correspond to the number of the 34,719 demand profiles from the unknowns that were identified using one of the three detectors. The rows 724 and 726 of the results table 700 may correspond to the number of the detected cases whose suspicious behavior may be explained away due to the customer's lot size being less than 500 square feet or the customer being a solar user. A customer being a solar user would be associated with low demand since that customer would be getting their power from the sun—not stealing electricity. A customer having a lot size of less than 500 square feet would also be associated with low demand, since the customer's small residence puts an upper bound on what the demand could be.

Column 702 (with the heading 'fraud_always_zero') may specify how many of the 123 known fraud cases were identified as having a median and max demand of always zero. For example, in the results table 700 it is shown that 2 of the 123 known fraud cases were identified as having a median and max demand of always zero. None of those 2 identified known fraud cases were explainable based on the customer having a lot size of under 500 square feet or being a solar user.

Column 704 (with the heading 'fraud_med_zero') may specify how many of the 123 known fraud cases were identified as having a median demand of zero and a maximum demand greater than zero. For example, in the results table 700 it is shown that 7 of the 123 known fraud cases were identified as having a median demand of zero and a maximum demand greater than zero. None of these 7 identified known fraud cases were explainable based on the customer having a lot size of under 500 square feet or being a solar user.

Column 706 (with the heading 'fraud_near_zero') may specify how many of the 123 known fraud cases were identified as having a median demand of between zero and the 10th percentile (here, 10 kWh). For example, in the results table 700 it is shown that 6 of the 123 known fraud cases were identified as having a median demand of between zero and the 10th percentile. None of these 6 identified known fraud cases were explainable based on the customer having a lot size of under 500 square feet or being a solar user.

Column 708 (with the heading 'u_always_zero') may specify how many of the 34,719 detected cases from the set of unknowns were identified as having a median and max demand of always zero. For example, in the results table 700 it is shown that 6556 of the 34,719 detected fraud cases were identified as having a median and max demand of always zero. Six of these detected fraud cases had a legitimate explanation based on the customer having a lot size of under 500 square feet.

Column 710 (with the heading 'u_med_zero') may specify how many of the 34,719 detected cases from the set of unknowns were identified as having a median demand of zero and a maximum demand greater than zero. For example, in the results table 700 it is shown that 6375 of the 34,719 detected fraud cases were identified as having a median demand of zero and a maximum demand greater than zero. Two of these detected fraud cases had a legitimate explanation based on the customer having a lot size of under 500 square feet.

Column 712 (with the heading 'u_near_zero') may specify how many of the 34,719 detected cases from the set of unknowns were identified as having a median demand of between zero and the 10th percentile. For example, in the results table 700 it is shown that 21788 of the 34,719 detected fraud cases were identified as having a median demand of between zero and the 10th percentile. Nine of these detected fraud cases had a legitimate explanation based on the customer having a lot size of under 500 square feet, and 10 of the detected fraud cases were due to the customer being a solar user.

Figure 8A:
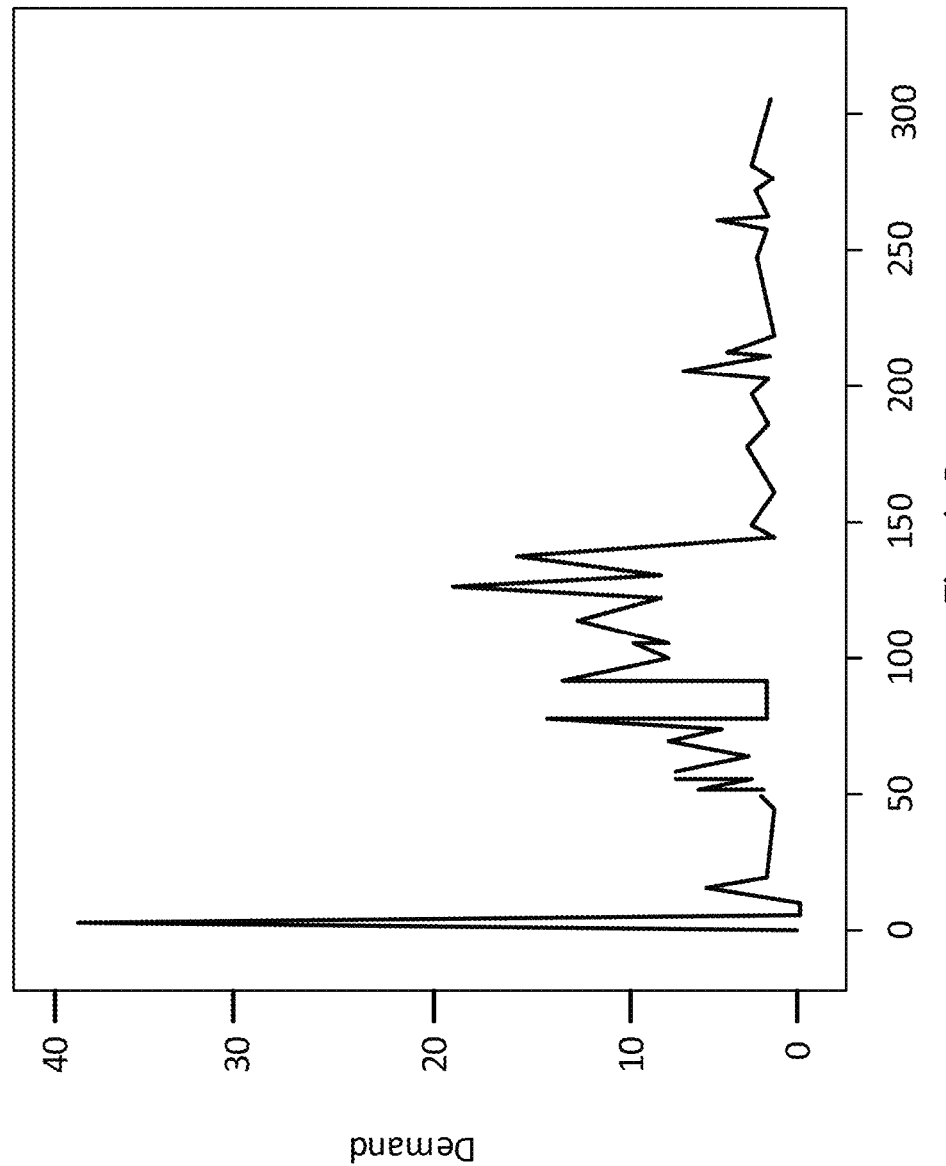
FIG. 8A illustrates an example graph of low median demand detected in a fraud case in accordance with embodiments of the present disclosure.

FIG. 8A illustrates an example graph of low median demand detected in an unknown fraud case in accordance with embodiments of the present disclosure.

More specifically, the figure depicts a graph of demand at a service point that was flagged using a detector based on the behavioral pattern of the median demand being very low for a time period of over 300 days. Although the graph includes spikes in maximum demand, the median demand can be seen as relatively low for the most part. This is a case of fraud flagged in the set of unknown cases (e.g., customers not previously identified as fraudulent) involving similar behavior as a known fraud incident (shown in FIG. 8B), and it represents an example of a case of fraud that would not have been identified using a training dataset based on traditional methods.

Figure 8B:
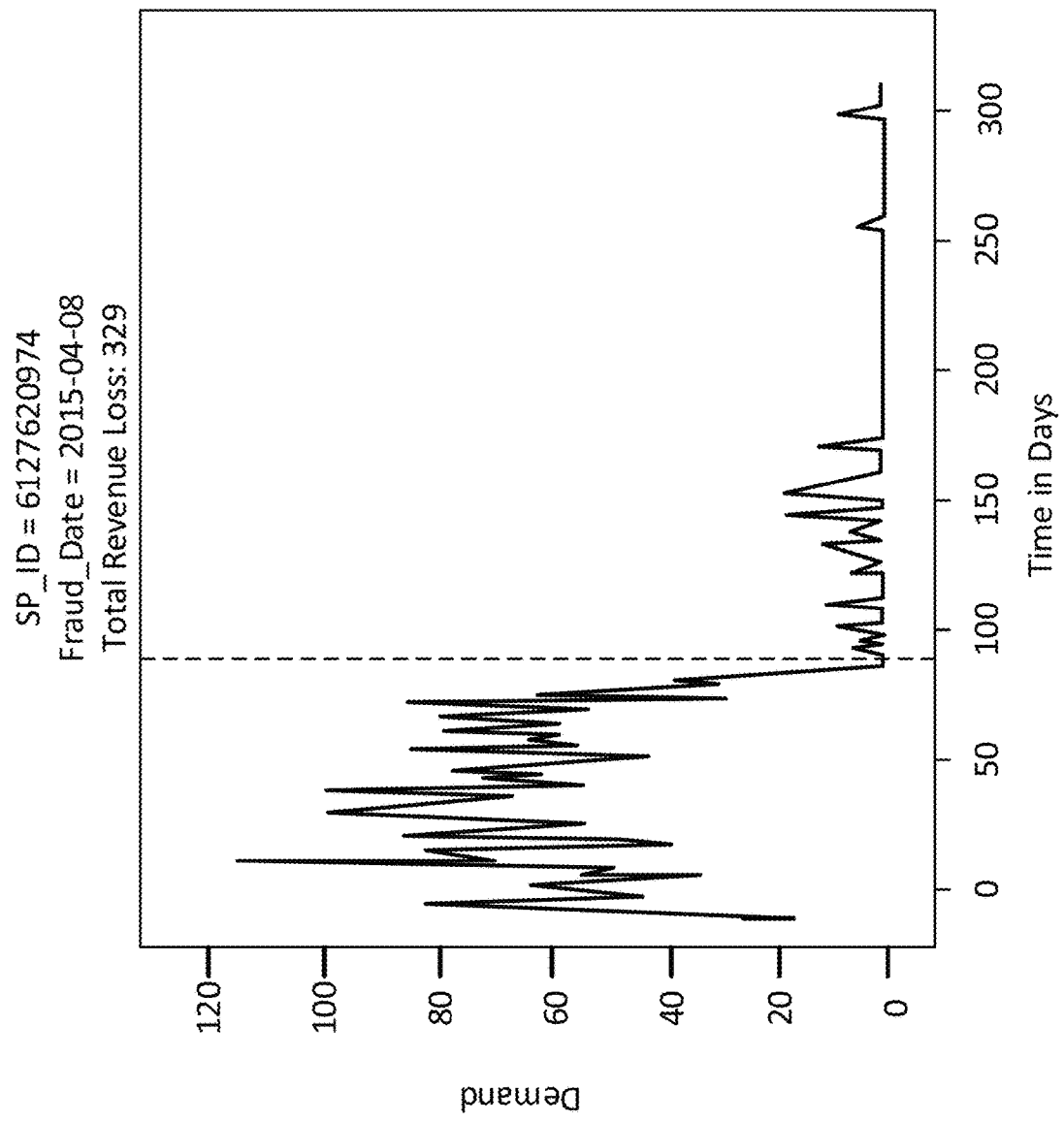
FIG. 8B illustrates an example graph of low median demand detected in a fraud case in accordance with embodiments of the present disclosure.

FIG. 8B illustrates an example graph of low median demand detected in a known fraud case in accordance with embodiments of the present disclosure.

This figure similarly depicts a graph of demand at a service point that was flagged using a detector based on the behavioral pattern of the median demand being very low for a time period of over 300 days. The graph initially has larger levels of demand but, at the fraud date corresponding to approximately 100 days of the account age, the demand drops off drastically and remains very low for the remainder of the graph. This is a case of fraud flagged in the set of known cases (e.g., customers that have already been verified as fraudulent), and thus the total revenue loss associated with this case of fraud is known. The detector flagging this known case of fraud is reassuring because it signifies that the detector is correctly flagging verified cases of fraud identified from traditional methods.

Figure 9A:
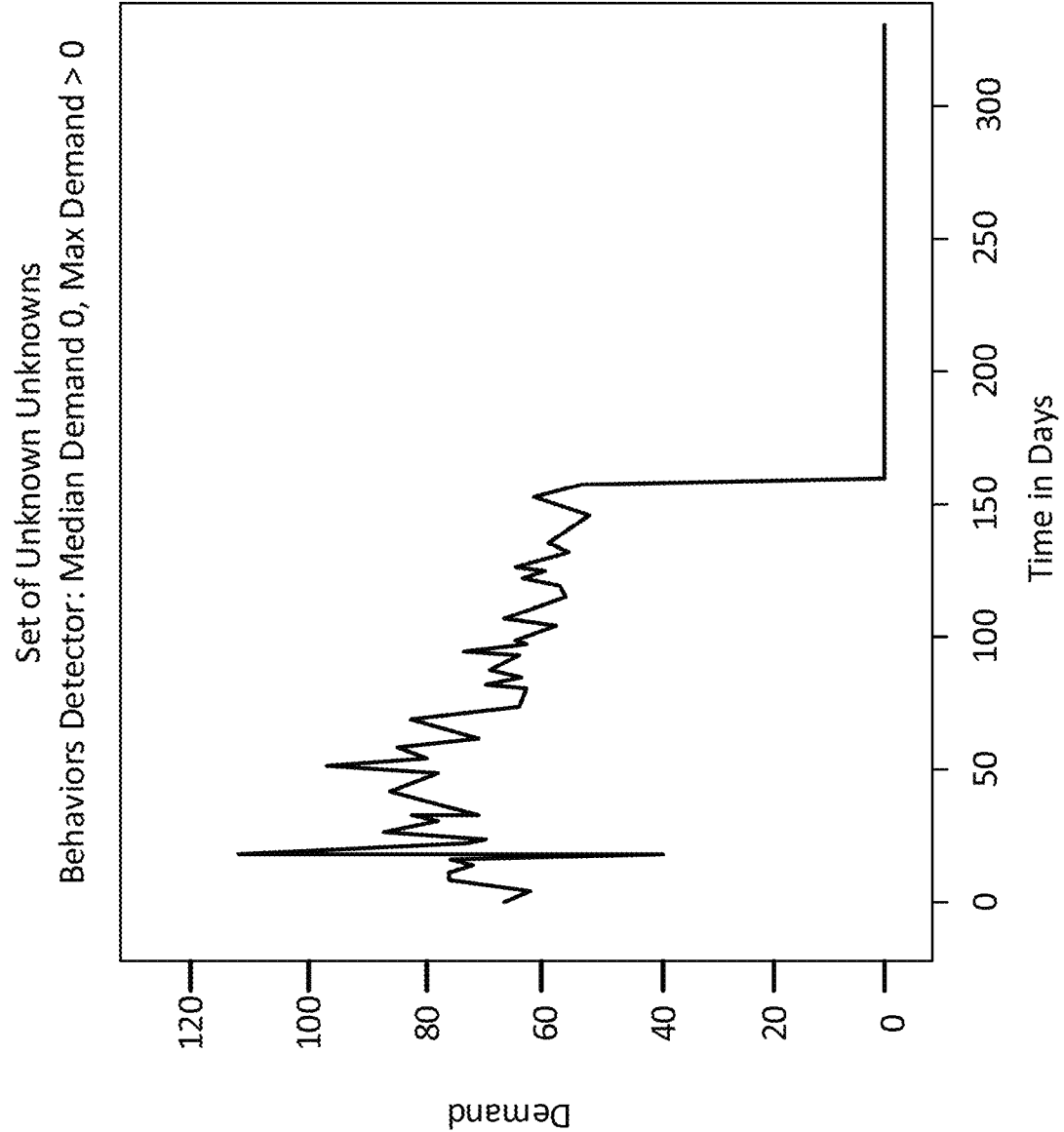
FIG. 9A illustrates an example graph of zero median demand detected in a fraud case in accordance with embodiments of the present disclosure.

FIG. 9A illustrates an example graph of zero median demand detected in an unknown fraud case in accordance with embodiments of the present disclosure.

More specifically, the figure depicts a graph of demand at a service point that was flagged using a detector based on the behavioral pattern of the median demand being zero and the maximum demand being greater than zero, for a time period of over 300 days. The graph begins initially with relatively high demand, but the demand quickly drops to zero and remains there for the remainder of the graph. This is a case of fraud flagged in the set of unknown cases (e.g., customers not previously identified as fraudulent) involving similar behavior as a known fraud incident (shown in FIG. 9B), and it represents an example of a case of fraud that would not have been identified using a training dataset based on traditional methods.

Figure 9B:
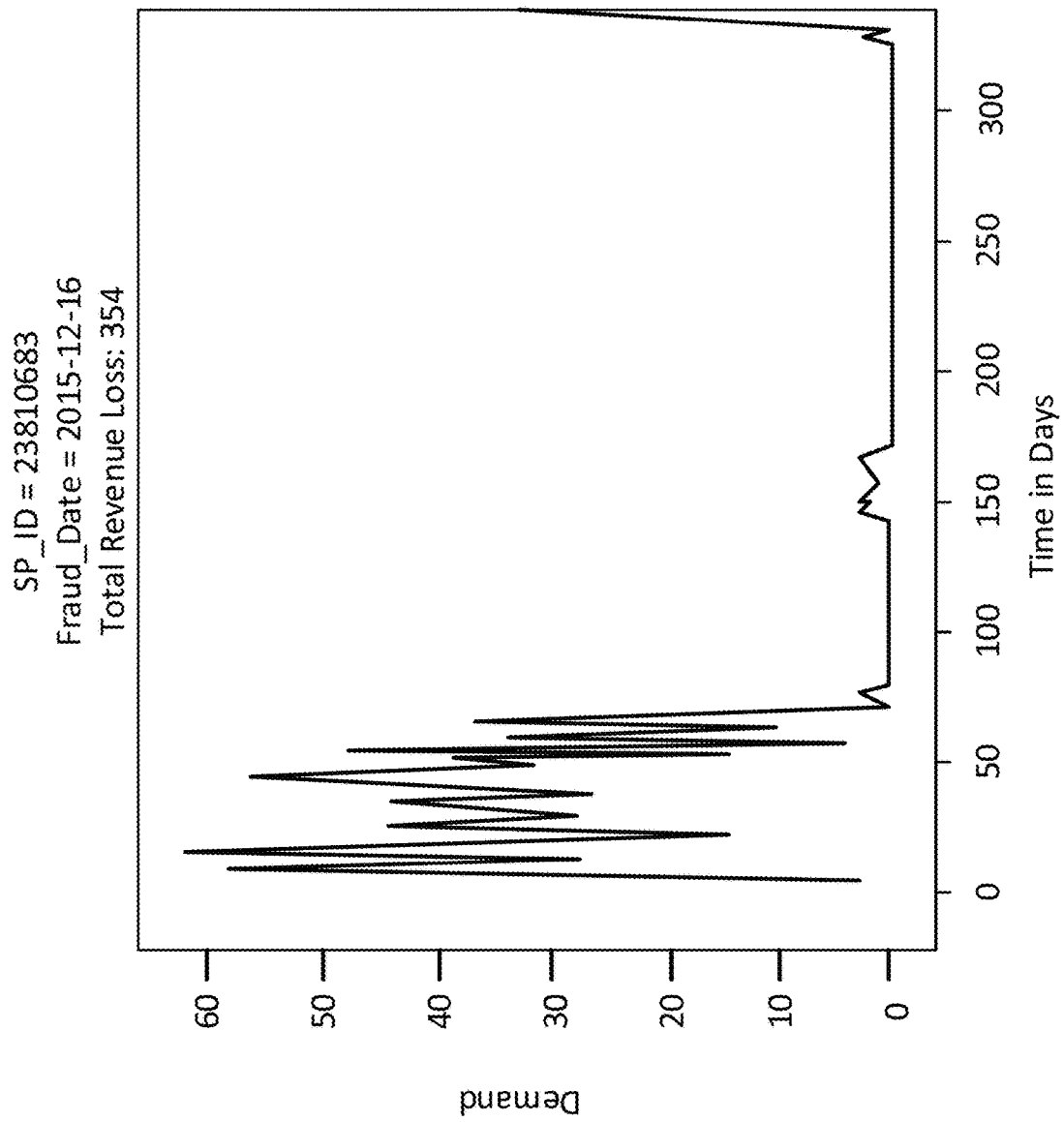
FIG. 9B illustrates an example graph of zero median demand detected in a fraud case in accordance with embodiments of the present disclosure.

FIG. 9B illustrates an example graph of zero median demand detected in a known fraud case in accordance with embodiments of the present disclosure.

This figure similarly depicts a graph of demand at a service point that was flagged using a detector based on the behavioral pattern of the median demand being zero and the maximum demand being greater than zero, for a time period of over 300 days. The graph initially has larger levels of demand but the demand drops off drastically. This is a case of fraud flagged by the detector in the set of known cases (e.g., an actual, verified case of known fraud), which is reassuring because it signifies that the detector is correctly flagging verified cases of fraud identified from traditional methods. For this case of known fraud, the actual detection of the fraud using traditional methods took over 200 days from the date at which the suspicious behavior began. In comparison, a detector configured to detect this type of behavior may be able to identify fraud much quicker after the suspicious behavior begins.

FIG. 10 illustrates example field activity flags corresponding to legitimate explanations of suspicious behavior in accordance with embodiments of the present disclosure.

More specifically, the figure shows tables with field activity flags that may be generated by the system whenever an activity is performed on an service point. These activities can be generated as a result of the electric utility company, the customer, or the environment. The activity flags corresponding to those activities may occur before, during, and/or after fraudulent activity has occurred and provide useful information which can be used to determine legitimate explanations for ruling out suspicious behavior. Thus, incorporating the activity flags may improve the detection framework and help identify false positives. For example, one activity flag that could occur on the date of fraud is "Meter Cut—Non Pay", which would signify that the associated service point has service cut due to failure of the customer to pay. Other examples of field activity flags can be seen in the figure.

Other information besides field activity flags may also be used to help identify false positives (e.g., sources of legitimate explanations for suspicious behavior). In some embodiments, the electricity fraud detection system may be able to use survey and/or census information. For example, surveys could be sent out to customers and from the surveys, it could be determined that people of a specific income bracket who live in a specific neighborhood tend to be more eco-conscious (e.g., environmentally friendly). In addition, this data could also be gleaned from a customer's social media in a continuous, real-time fashion. In some cases, a demand profile that is typical for someone who is eco-conscious can be determined and used for comparison purposes (e.g., this is the behavior of someone who is eco-conscious). In some embodiments, this determination can be done using machine-learning algorithms. Thus, the behavior of any identified customers with suspicious behavior can be compared to the behavior of customers known to be eco-conscious in order to determine if one of the legitimate explanations for the suspicious behavior is the customer is eco-conscious. Accordingly, the information used by the system to identify false positives may come from a combination of surveys, social media, assumptions gathered from demand profiles, and/or from the metering technology itself.

In some embodiments, the outputs of the electricity fraud detection system disclosed herein may be usable to enable entirely new systems to be developed. Due to the inherent dependencies of these systems, existing methods (e.g., machine learning or expert-based systems) prevent such systems from being developed since they cannot accurately arrive at probabilities in a data-driven mathematically rigorous fashion, they do not scale, and they may be practically impossible (e.g., it would take a human too long to arrive at an answer in time to have a meaningful impact).

In some embodiments, the electricity fraud detection system may be configured to allow for automatic hypothesis generation, such that hypothesis can be generated and tested without requiring domain knowledge from a user (e.g., someone defining the detectors or the false positive explanations) of the system. As previously discussed, a user may specify the patterns of behavior (e.g., the detectors) they are looking to detect in the demand profile. Or the user may specify legitimate explanations for suspicious behavior in the false positive rules engine. In embodiments of the system configured for automatic hypothesis generation, the user could continue to specify detectors and/or false positive rules, or they could allow the system to automatically come up with the hypothesis for detection and perform the entire process autonomously end-to-end (e.g., the system would automatically perform detection of customers with suspicious behavior, then explain away any legitimate behavior using the false positive rules engine, and then produce a result of the customers with unexplained suspicious behavior).

Figure 11:
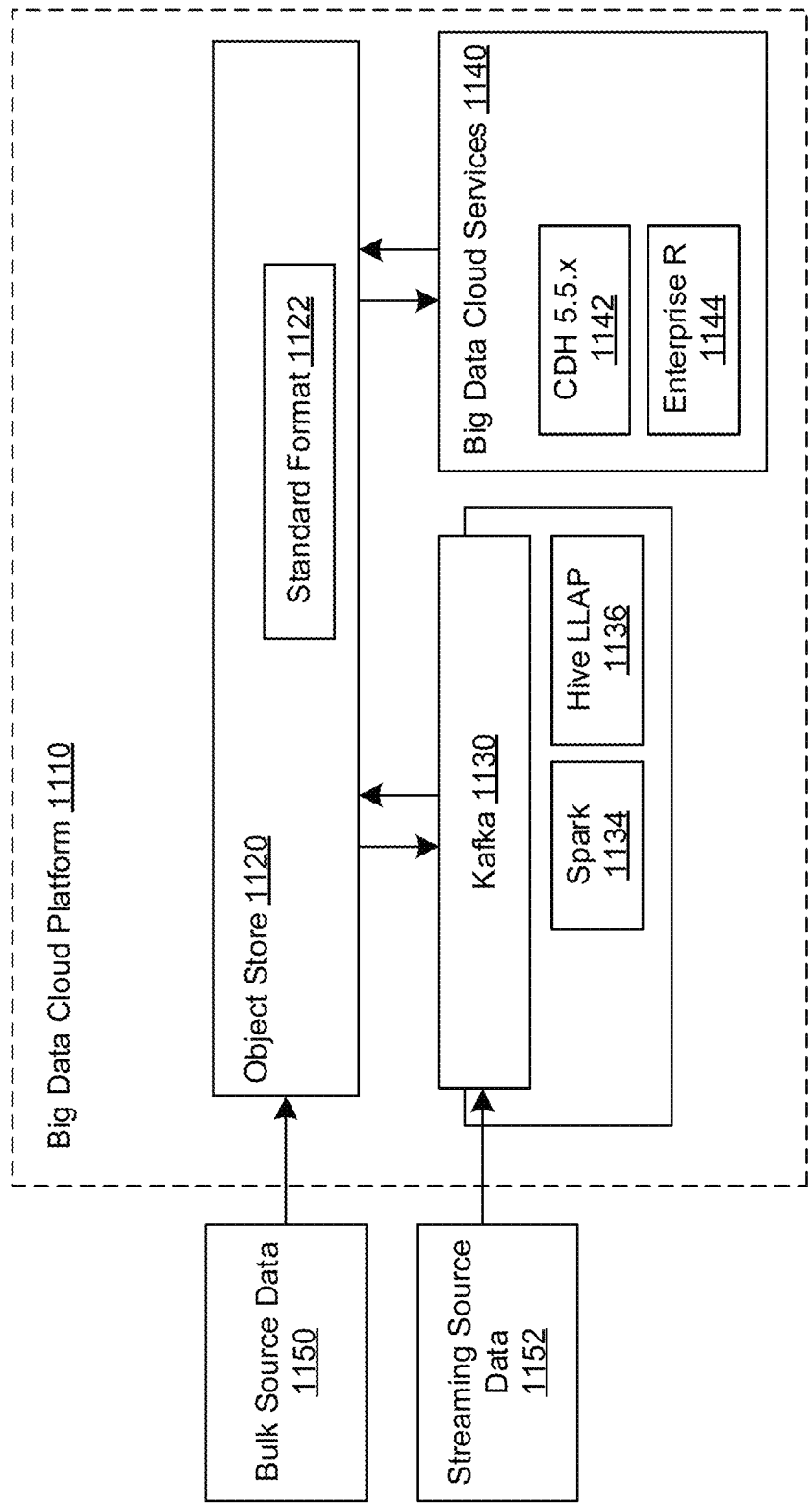
FIG. 11 illustrates a block diagram for implementing electricity fraud detection in accordance with embodiments of the present disclosure.

FIG. 11 illustrates a block diagram for implementing electricity fraud detection in accordance with embodiments of the present disclosure.

In some embodiments, the implementation solution for the electricity fraud detection system may involve a Big Data Cloud Platform 1110. In some embodiments, the Big Data Cloud Platform 1110 may store all electrical usage data in an Object Store 1120 under a Standard Format 1122.

In some embodiments, the Object Store 1120 may be maintained and provided through Big Data Cloud Services 1140. In some embodiments, Big Data Cloud Services 1140 may include Cloudera 1142, an open source Apache Hadoop distribution. Thus, the data contained in the Object Store 1120 may be stored using Apache Hadoop, an open source software framework used for distributed storage and processing of large datasets. The data contained in the Object Store 1120 may be split up and stored in large blocks that are distributed across nodes in a computing cluster. In some embodiments, Big Data Cloud Services 1140 may further include Enterprise R 1144, which provides the use of R, the open source statistical programming language and environment, on the large volumes of data contained within the Object Store 1120. Enterprise R 1144 may allow the development and deployment of automated data analysis, which can be used in this instance to detect the existence of fraudulent behavior in customer's electrical usage patterns.

As shown in the figure, the Big Data Cloud Platform 1110 may receive Bulk Source Data 1150 and Streaming Source Data 1152. Generally, Bulk Source Data 1150 may include historical data such as the electrical usage and demand profiles of customers, as well as data items associated with previously observed cases of fraudulent activity. In some embodiments, Bulk Source Data 1150 may be stored in the Object Store 1120, which may be referred to as a "data lake". All of the data stored in the Object Store 1120 may be uniformly stored in a Standard Format 1122. In some embodiments, the Standard Format 112 can be (Hadoop Distributed File System) HDFS, a Java-based filed system used to provide scalable and reliable data storage.

The Streaming Source Data 1152 may include the actual electrical usage of customers that is received in real-time (e.g., from meters). For each customer, their real-time electrical usage may be streamed to the Big Data Cloud Platform 1110. In some embodiments, the Streaming Source Data 1152 may be received at a communication interface, such Kafka 1130. As a communication interface, Kafka 1130 may receive the Streaming Source Data 1152 and parse out the individual messages in that data. Those messages can be converted into data that can be stored in the Object Store 1120 (e.g., in the Standard Format 1122). Thus, the Object Store 1120 may contain data from the Bulk Source Data 1150 (e.g., historical electrical usage for customers) and the Streaming Source Data 1152 (e.g., real-time electrical usage for customers) in the same uniform format.

In some embodiments, Spark 1134 and/or Hive LLAP 1136 are further used to analyze and process all of the data contained within the Object Store 1120 (e.g., in order to detect fraudulent behavior). Spark 1134 (e.g., Apache Spark) may provide a cluster-computing framework serving as a fast and general engine for big data processing via built-in modules for streaming data and machine learning. In other words, Spark 1134 may provide features for performing big data analytics using distributed processing of large data sets across clusters of computers and may improve upon the base Hadoop Map/Reduce technique for the distributed processing of large amounts of data. Spark 1134 may supercharge the native Hadoop Map/Reduce functionality by persisting in memory, whereas Map/Reduce persists to the disk. The result is that Spark 1134 can be 100 times faster than Map/Reduce in terms of memory operations and 10 times faster than Map/Reduce in terms of disk operations.

In some embodiments, Spark 1134 may include Oracle R Advanced Analytics for Hadoop (ORAAH), which may serve as a "supercharged" version of Spark that provides features for performing big data analytics using distributed processing of large data sets across clusters of computers. ORAAH may provide numerous advantages over the traditional Spark package. For instance, ORAAH may provide machine learning models (e.g., machine learning algorithms for classification, clustering, regression, feature extraction, etc.) that are 32 times faster than Spark. ORAAH may also provide the capability to deploy machine learning models developed in R&D into production. ORAAH may also provide the capability of executing R scripts directly in the data lake. ORAAH may also serve as a single package that allows for reading/writing data from multiple data formats, including HDFS and/or HIVE. ORAAH may also be able to handle any formula present in R, whereas Spark may only be able to handle simple attributes with a limited subset of transformations.

In some embodiments, Hive LLAP 1136 may include Apache Hive, a data warehouse software project built on top of the Apache Hadoop platform for providing an SQL-like interface for data summarization, query, and analysis. Hive LLAP (Low Latency Analytical Processing) 1136 may build on the Hive architecture by providing faster SQL analytics. Thus, Kafka 1130 is used to parse and obtain messages from streaming data, which are then added to the historical data in the Object Store 1120. This "data lake" contained in the Object Store 1120 is processed using Spark 1134 and Hive LLAP 1136 in order to perform the steps for detecting electricity fraud that were previously described herein.

In some embodiments, the Object Store 1120 may be implemented in a manner that provides decoupled storage, a feature associated with an increase in computing efficiency and a reduction in the necessary computing resources. Hadoop typically consists of a combination of HDFS and MapReduce. However, the issue with HDFS is that the compute is on each node (e.g., clusters of a distributed computing system) and more nodes need to be added in order to obtain additional compute. Each node contains compute and storage which means that, by adding more nodes, storage is being effectively paid for that is not being used. As an alternative, a storage mechanism other than HDFS can be used, such as Amazon S3 or Oracle Object Storage. For instance, HDFS can be swapped out so that the system is implemented on a combination of Object Storage and MapReduce. Under this implementation, the storage is decoupled and nodes can be added with minimal storage, reducing the additional costs that would be associated with that storage. In other words, a service such as Oracle's Big Data Cloud Service—Compute Edition can be used to provision additional Hadoop or Spark clusters on demand, but the data itself is kept within Amazon S3 or Oracle Object Storage and is retrieved by the clusters when needed.

Figure 12:
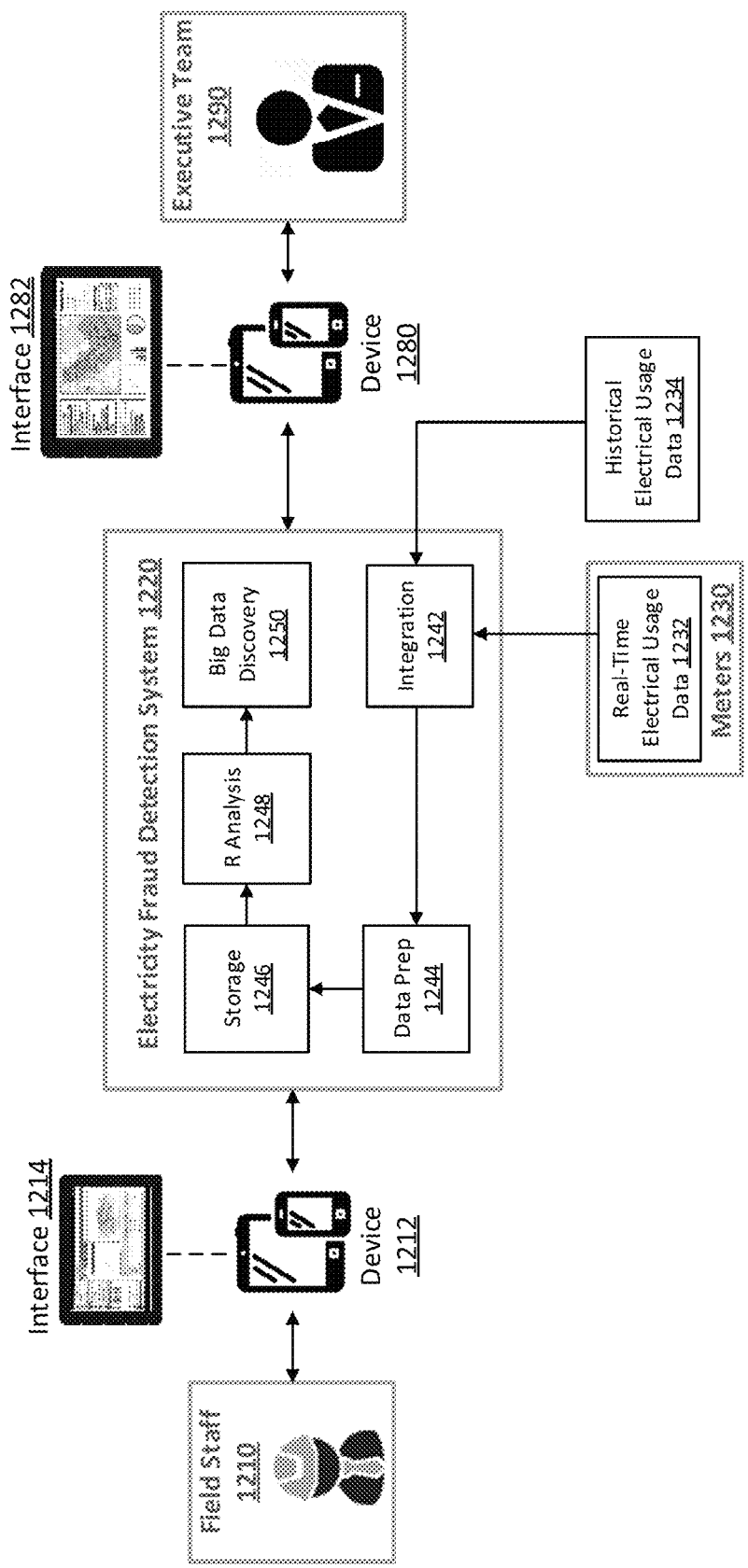
FIG. 12 illustrates a hybrid system diagram for electricity fraud detection in accordance with embodiments of the present disclosure.

FIG. 12 illustrates a hybrid system diagram for electricity fraud detection in accordance with embodiments of the present disclosure.

As shown in the figure, an Electricity Fraud Detection System 1220 receives Real-Time Electrical Usage Data 1232 and Historical Electrical Usage Data 1234 associated with various customers. In some embodiments, the Real-Time Electrical Usage Data 1232 is received directly from one or more Electrical Meters 1230, with each meter providing real-time usage data associated with a customer.

The Electricity Fraud Detection System 1220 may intake all of this data at block 1242. This may involve specialized communication interfaces (e.g., programming interfaces or APIs) configured for communicating with, and receiving data from, the one or more Electrical Meters 1230. There may also be communication interfaces configured for communicating with, and receiving data from, any computer systems or devices storing the Historical Electrical Usage Data 1234. For instance, if Historical Electrical Usage Data 1234 is stored on a cloud computing network, the Electricity Fraud Detection System 1220 may have communication interfaces for retrieving all of that data from the cloud computing network.

Once all of the data has been integrated within the Electricity Fraud Detection System 1220, at block 1244, the Electricity Fraud Detection System 1220 may convert all of the data into a singular, uniform format (e.g., making sure all the dates/times follow the same format) so that the historical and real-time electrical usage data for any customer can be combined and used together.

At block 1246, the Electricity Fraud Detection System 1220 may store all of the data (e.g., the historical and real-time electrical usage data for all the customers) in storage, such as the Object Store 1120 shown in FIG. 11. At block 1248, the Electricity Fraud Detection System 1220 may perform R analysis on all of the data in the storage. For each customer, the Electricity Fraud Detection System 1220 may determine a usage demand profile based on their historical and real-time electrical usage. At block 1250, the Electricity Fraud Detection System 1220 may analyze the usage for each customer in order to detect fraudulent activity of one or more customers.

Once the Electricity Fraud Detection System 1220 has identified potential fraudulent activity, members of the Executive Team 1290 may be able to view reports on customers identified to be potentially committing fraudulent activity through an interface 1282 on a device 1280. The device 1280 may receive those reports generated from the Electricity Fraud Detection System 1220. Furthermore, the members of the Executive Team 1290 may be able to pull up and view the usage demand profile for any customer (e.g., based on service point id or address associated with the customer's residence). This allows a human to have additional confirmation for any identified potential fraudulent activity by looking at the customer's usage demand profile to perceive any abnormalities. Once the members of the Executive Team 1290 further confirm any identified potential fraudulent activity associated with a customer, they may directly indicate within the interface 1282 to instruct Field Staff 1210 to physically go to the customer's location to inspect the meter and confirm that there is fraudulent activity going on.

The Device 1280 will then send the instruction to the Electricity Fraud Detection System 1220, which will then determine the closest Field Staff 1210 (e.g., geographically) to the customer's address. If there are multiple customers in the instance of multiple cases of fraudulent activity, then customers may also be divided up amongst the field staff based on proximity (e.g., Field Staff 1210 may receive a pool of customers that are in their geographic location). The Electricity Fraud Detection System 1220 may then forward the instruction to the Device 1212 associated with the Field Staff 1210. The Field Staff 1210 may be able to view the instruction and the customer's address through Interface 1214 on the Device 1212. Afterwards, the Field Staff 1210 may then physically go to the customer's address to inspect the meter and perform an investigation of any fraudulent activity being performed by the customer in order to verify fraud is occurring. The Field Staff 1210 may be able to indicate whether fraudulent activity is actually occurring through the Interface 1214 on the Device 1212. This information can be reported back to the Executive Team 1290, or it may be added to the existing data (e.g., stored by the Electricity Fraud Detection System 1220) in order to update or improve any existing behavioral models for detecting fraud.

Figure 13:
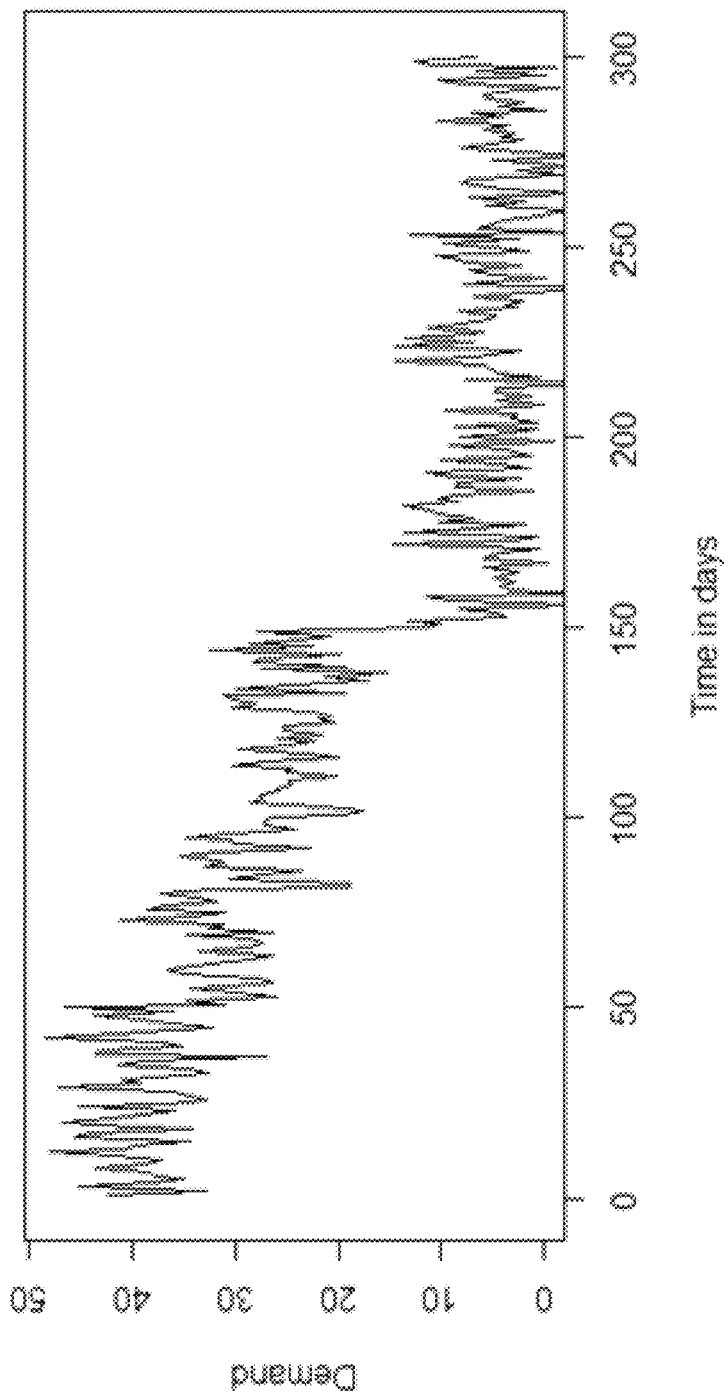
FIG. 13 illustrates an example behavioral pattern for a sudden decrease in demand, followed by the demand remaining low, in accordance with embodiments of the present disclosure.

FIG. 13 illustrates an example behavioral pattern for a sudden decrease in demand, followed by the demand remaining low, in accordance with embodiments of the present disclosure.

As shown in the figure, a sudden decrease in demand (e.g., a drop from about 25 to 5) occurs at around day 150 and the demand continues to remain low (e.g., at about an average of 5). Although the demand had already been slightly trending downwards, the sudden decrease in demand can still be considered abnormal and may be characteristic of the initiation of ongoing electricity fraud. This behavioral pattern may be used as a detector in order to identify potential suspicious activity.

FIG. 14 illustrates an example behavioral pattern for a slow decrease in demand, followed by the demand remaining low, in accordance with embodiments of the present disclosure.

As shown in the figure, the demand profile exhibits a slight trend downwards until it reaches a permanent low (e.g., at about an average of 5). Although there are numerous reasons why electricity demand could decrease over time (e.g., the user's electricity consumption habits may change), those reasons would have to somehow correspond to the gradual, slow decline in the demand profile followed by continued low demand. The slow decline may be characteristic of ongoing electricity fraud, and this behavioral pattern may be used as a detector in order to identify potential suspicious activity.

FIG. 15 illustrates an example behavioral pattern for a slow decrease in demand over an extended period, in accordance with embodiments of the present disclosure.

As shown in the figure, the demand profile exhibits a downward trend over the entire period of time. As with FIG. 14, although there are numerous reasons why electricity demand could decrease over time (e.g., the user's electricity consumption habits may change), the extended decline in the demand profile may be characteristic of ongoing electricity fraud, and this behavioral pattern may be used as a detector in order to identify potential suspicious activity.

FIG. 16 illustrates an example behavioral pattern for very low demand, in accordance with embodiments of the present disclosure.

As shown in the figure, the demand profile remains very low (e.g., an average of 2.5) over the entire duration of time. Although it is possible the user has very low electricity consumption over that time period (e.g., the user has been out of the country and the electricity consumption is due to any plugged-in appliances drawing electricity), the extended period of time of low demand may be characteristic of ongoing electricity fraud and the true demand profile being hidden. This behavioral pattern may be used as a detector in order to identify potential suspicious activity.

Figure 17:
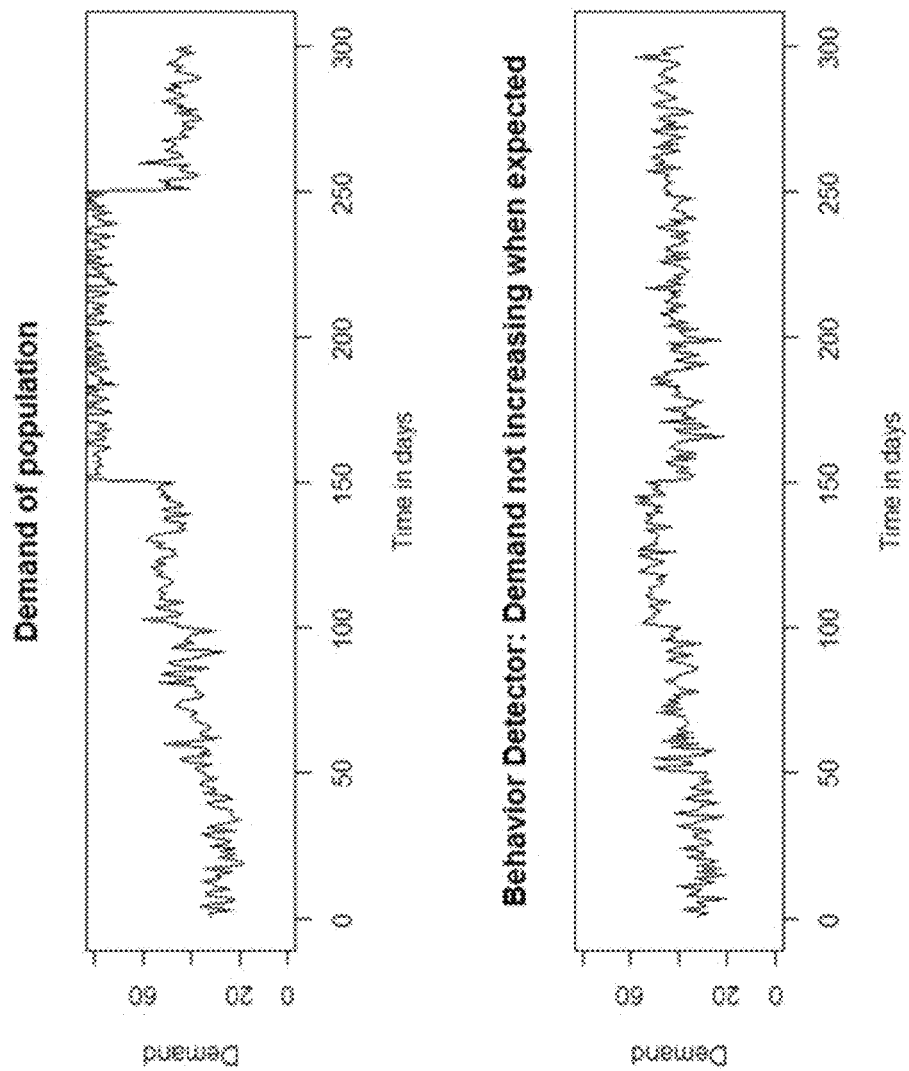
FIG. 17 illustrates an example behavioral pattern for the demand not rising when it is expected to, in accordance with embodiments of the present disclosure.

FIG. 17 illustrates an example behavioral pattern for the demand not rising when it is expected to, in accordance with embodiments of the present disclosure.

As shown in the figure, the demand of an entire population of users can be plotted out (e.g., the ECDF) in order to observe what the overall population is doing. At day 150, there is a sudden spike in demand across the entire population (e.g., a sudden increase from 55 to 70). This elevated demand persists until day 250, after which there is a sudden drop in demand across the entire population (e.g., a sudden drop from 70 back down to 55). There may be numerous reasons for the temporary, elevated demand across the entire population of users. For instance, the elevated demand could represent typical demand behavior in the summer. Temperatures between day 150 and day 250 may have been higher, which results in usage spikes due to the entire population of users turning on and running their air conditioners.

At the same time, the demand profile for a single user can be plotted out and compared to the demand of the entire population over that same time period. This comparison can be used to reveal what the user's demand profile "should have" exhibited (e.g., if the user behaved like the overall population) but did not. For instance, the user's demand profile does not exhibit the elevated demand from day 150 to day 250 that was seen in the demand across the entire population. The user's demand profile differs from the populations substantially. There may be numerous reasons for this. For instance, if the elevated demand in the population was due to higher temperatures, then this user may not have used an air conditioner and simply endured the heat. However, another explanation could be that the user's demand profile is not correct due to ongoing electricity fraud (e.g., the user's demand is being misreported). Accordingly, this behavioral pattern may be used as a detector in order to identify potential suspicious activity, especially suspicious activity that would not otherwise be observed if the user was not being compared to others.

Figure 18:
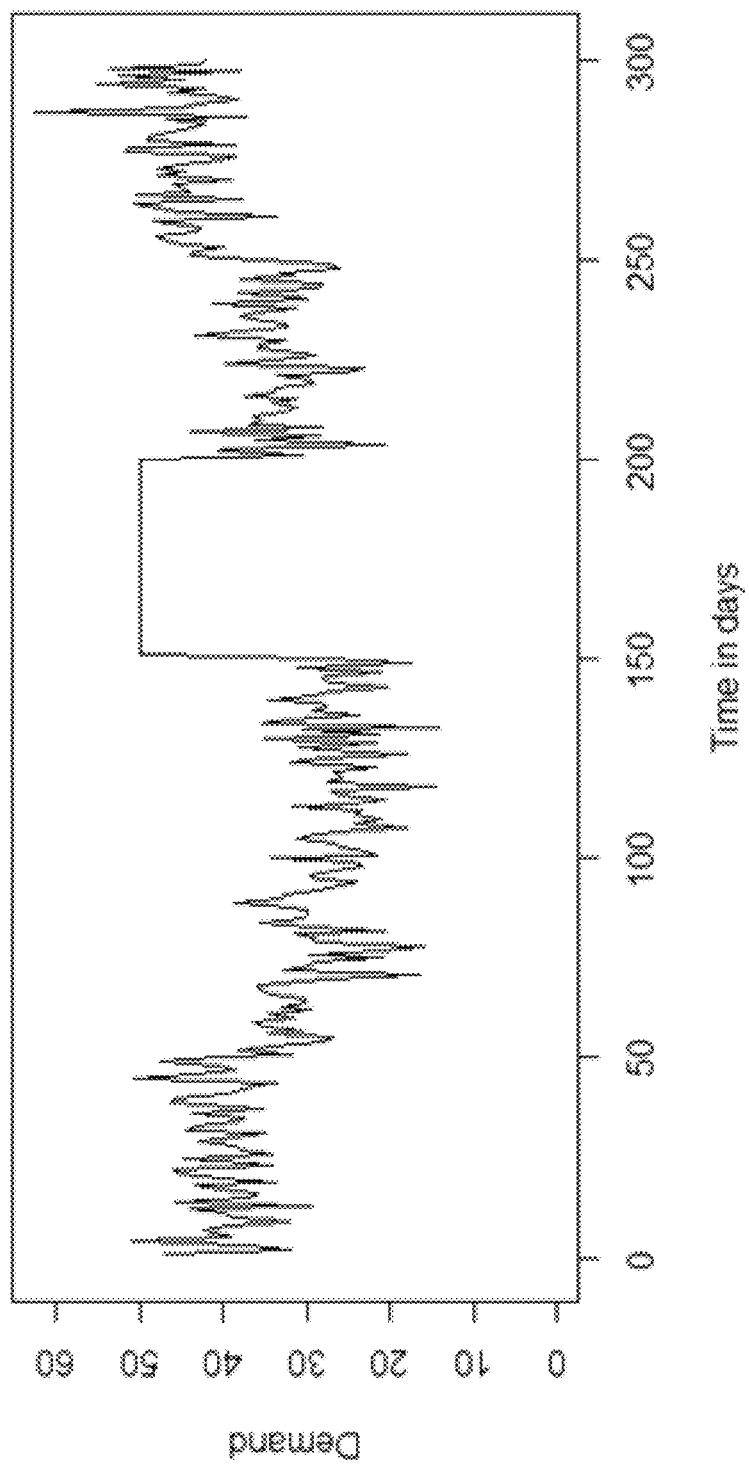
FIG. 18 illustrates an example behavioral pattern for the demand is too abnormally stable, in accordance with embodiments of the present disclosure.

FIG. 18 illustrates an example behavioral pattern for the demand is too abnormally stable, in accordance with embodiments of the present disclosure.

As shown in the figure, the demand profile is abnormally stable over a period of time. Between the time period of day 150 to day 200, the user's demand stays at a constant 50. This is quite unusual when compared to the normal electricity usage outside of that time period which has some variability to it (e.g., like a transient signal). One explanation for the abnormal stability in the demand profile is that the user's demand profile is not correct due to ongoing electricity fraud (e.g., the user's demand over that period of time with abnormal stability is being misreported). Accordingly, this behavioral pattern may be used as a detector in order to identify potential suspicious activity.

Additional Implementation Details

Figure 19:
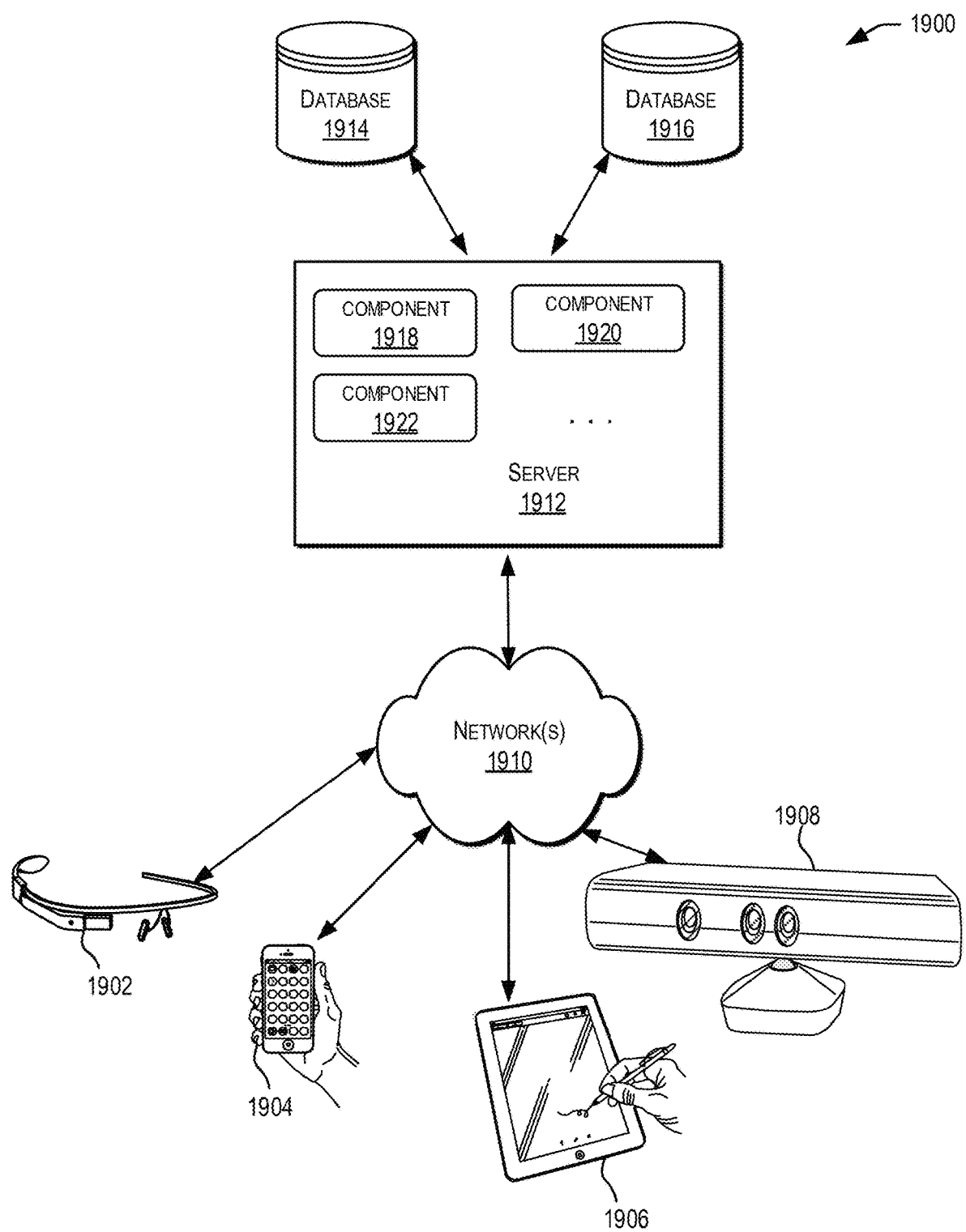
FIG. 19 depicts a simplified diagram of a distributed system for implementing one of the embodiments.

FIG. 19 depicts a simplified diagram of a distributed system 1900 for implementing one of the embodiments disclosed herein. The distributed system 1900 can implement embodiments of electricity fraud detection systems, as previously discussed. In the illustrated embodiment, distributed system 1900 includes one or more client computing devices 1902, 1904, 1906, and 1908, which are configured to execute and operate a client application such as a web browser, proprietary client (e.g., Oracle Forms), or the like over one or more network(s) 1910. Server 1912 may be communicatively coupled with remote client computing devices 1902, 1904, 1906, and 1908 via network 1910.

In various embodiments, server 1912 may be adapted to run one or more services or software applications provided by one or more of the components of the system. The services or software applications can include nonvirtual and virtual environments. Virtual environments can include those used for virtual events, tradeshows, simulators, classrooms, shopping exchanges, and enterprises, whether two- or three-dimensional (3D) representations, page-based logical environments, or otherwise. In some embodiments, these services may be offered as web-based or cloud services or under a Software as a Service (SaaS) model to the users of client computing devices 1902, 1904, 1906, and/or 1908. Users operating client computing devices 1902, 1904, 1906, and/or 1908 may in turn utilize one or more client applications to interact with server 1912 to utilize the services provided by these components.

In the configuration depicted in FIG. 19, the software components 1918, 1920 and 1922 of system 1900 are shown as being implemented on server 1912. In other embodiments, one or more of the components of system 1900 and/or the services provided by these components may also be implemented by one or more of the client computing devices 1902, 1904, 1906, and/or 1908. Users operating the client computing devices may then utilize one or more client applications to use the services provided by these components. These components may be implemented in hardware, firmware, software, or combinations thereof. It should be appreciated that various different system configurations are possible, which may be different from distributed system 1900. The embodiment shown in FIG. 19 is thus one example of a distributed system for implementing an embodiment system and is not intended to be limiting.

Client computing devices 1902, 1904, 1906, and/or 1908 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 1902, 1904, 1906, and 1908 may be any other electronic device, such as a thin-client computer, an Internet-enabled gaming system (e.g., a Microsoft Xbox gaming console with or without a Kinect® gesture input device), and/or a personal messaging device, capable of communicating over network(s) 1910.

Although exemplary distributed system 1900 is shown with four client computing devices, any number of client computing devices may be supported. Other devices, such as devices with sensors, etc., may interact with server 1912.

Network(s) 1910 in distributed system 1900 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 1910 can be a local area network (LAN), such as one based on Ethernet, Token-Ring and/or the like. Network(s) 1910 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 1912 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 1912 can include one or more virtual machines running virtual operating systems, or other computing architectures involving virtualization. One or more flexible pools of logical storage devices can be virtualized to maintain virtual storage devices for the server. Virtual networks can be controlled by server 1912 using software defined networking. In various embodiments, server 1912 may be adapted to run one or more services or software applications described in the foregoing disclosure. For example, server 1912 may correspond to a server for performing processing described above according to an embodiment of the present disclosure.

Server 1912 may run an operating system including any of those discussed above, as well as any commercially available server operating system. Server 1912 may also run any of a variety of additional server applications and/or mid-tier applications, including HTTP servers, FTP servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 1912 may include one or more applications to analyze and consolidate data feeds and/or event updates received from users of client computing devices 1902, 1904, 1906, and 1908. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), click-stream analysis tools, automobile traffic monitoring, and the like. Server 1912 may also include one or more applications to display the data feeds and/or real-time events via one or more display devices of client computing devices 1902, 1904, 1906, and 1908.

Distributed system 1900 may also include one or more databases 1914 and 1916. Databases 1914 and 1916 may reside in a variety of locations. By way of example, one or more of databases 1914 and 1916 may reside on a non-transitory storage medium local to (and/or resident in) server 1912. Alternatively, databases 1914 and 1916 may be remote from server 1912 and in communication with server 1912 via a network-based or dedicated connection. In one set of embodiments, databases 1914 and 1916 may reside in a storage-area network (SAN). Similarly, any necessary files for performing the functions attributed to server 1912 may be stored locally on server 1912 and/or remotely, as appropriate. In one set of embodiments, databases 1914 and 1916 may include relational databases, such as databases provided by Oracle, that are adapted to store, update, and retrieve data in response to SQL-formatted commands.

Figure 20:
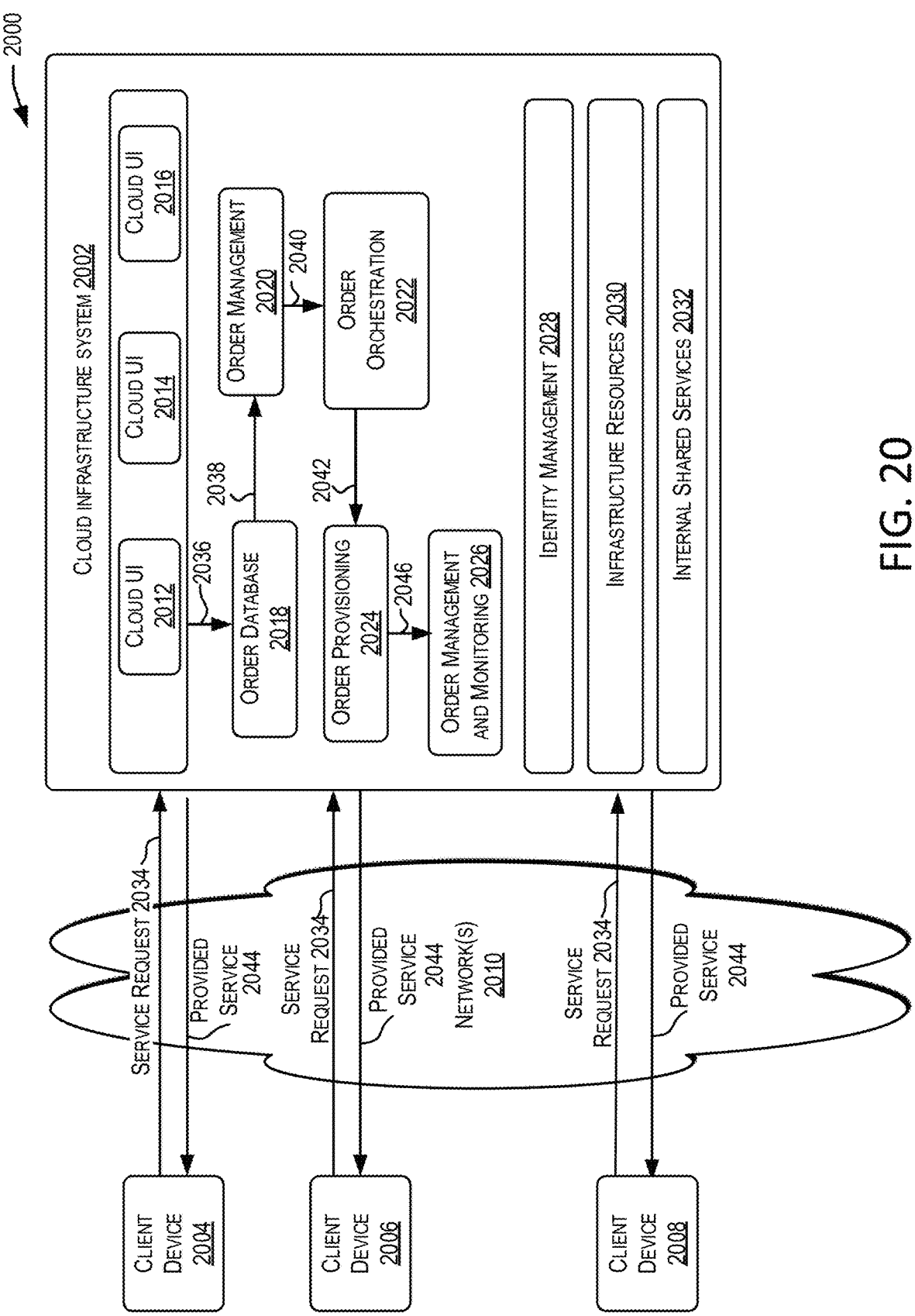
FIG. 20 is a simplified block diagram of components of a system environment by which services provided by the components of an embodiment system may be offered as cloud services, in accordance with an embodiment of the present disclosure.

FIG. 20 is a simplified block diagram of one or more components of a system environment 2000 by which services provided by one or more components of an embodiment system may be offered as cloud services, in accordance with an embodiment of the present disclosure. The system environment 2000 can include or implement embodiments of electricity fraud detection systems as previously described. In the illustrated embodiment, system environment 2000 includes one or more client computing devices 2004, 2006, and 2008 that may be used by users to interact with a cloud infrastructure system 2002 that provides cloud services. The client computing devices may be configured to operate a client application such as a web browser, a proprietary client application (e.g., Oracle Forms), or some other application, which may be used by a user of the client computing device to interact with cloud infrastructure system 2002 to use services provided by cloud infrastructure system 2002.

It should be appreciated that cloud infrastructure system 2002 depicted in FIG. 20 may have other components than those depicted. Further, the embodiment shown in FIG. 20 is only one example of a cloud infrastructure system that may incorporate an embodiment of the invention. For example, the cloud infrastructure system 2002 can include or implement one or more elements of the electricity fraud detection systems as previously described. In some other embodiments, cloud infrastructure system 2002 may have more or fewer components than shown in FIG. 20, may combine two or more components, or may have a different configuration or arrangement of components.

Client computing devices 2004, 2006, and 2008 may be devices similar to those described above for 1902, 1904, 1906, and 1908.

Although exemplary system environment 2000 is shown with three client computing devices, any number of client computing devices may be supported. Other devices such as devices with sensors, etc. may interact with cloud infrastructure system 2002.

Network(s) 2010 may facilitate communications and exchange of data between clients 2004, 2006, and 2008 and cloud infrastructure system 2002. Each network may be any type of network familiar to those skilled in the art that can support data communications using any of a variety of commercially-available protocols, including those described above for network(s) 1910.

Cloud infrastructure system 2002 may comprise one or more computers and/or servers that may include those described above for server 1912.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 2002 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Large volumes of data, sometimes referred to as big data, can be hosted and/or manipulated by the infrastructure system on many levels and at different scales. Such data can include data sets that are so large and complex that it can be difficult to process using typical database management tools or traditional data processing applications. For example, terabytes of data may be difficult to store, retrieve, and process using personal computers or their rack-based counterparts. Such sizes of data can be difficult to work with using most current relational database management systems and desktop statistics and visualization packages. They can require massively parallel processing software running thousands of server computers, beyond the structure of commonly used software tools, to capture, curate, manage, and process the data within a tolerable elapsed time.

Extremely large data sets can be stored and manipulated by analysts and researchers to visualize large amounts of data, detect trends, and/or otherwise interact with the data. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an embodiment to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various embodiments, cloud infrastructure system 2002 may be adapted to automatically provision, manage and track a customer's subscription to services offered by cloud infrastructure system 2002. Cloud infrastructure system 2002 may provide the cloud services via different deployment models. For example, services may be provided under a public cloud model in which cloud infrastructure system 2002 is owned by an organization selling cloud services (e.g., owned by Oracle) and the services are made available to the general public or different industry enterprises. As another example, services may be provided under a private cloud model in which cloud infrastructure system 2002 is operated solely for a single organization and may provide services for one or more entities within the organization. The cloud services may also be provided under a community cloud model in which cloud infrastructure system 2002 and the services provided by cloud infrastructure system 2002 are shared by several organizations in a related community. The cloud services may also be provided under a hybrid cloud model, which is a combination of two or more different models.

In some embodiments, the services provided by cloud infrastructure system 2002 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 2002. Cloud infrastructure system 2002 then performs processing to provide the services in the customer's subscription order.

In some embodiments, the services provided by cloud infrastructure system 2002 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 2002 may also include infrastructure resources 2030 for providing the resources used to provide various services to customers of the cloud infrastructure system. In one embodiment, infrastructure resources 2030 may include pre-integrated and optimized combinations of hardware, such as servers, storage, and networking resources to execute the services provided by the PaaS platform and the SaaS platform.

In some embodiments, resources in cloud infrastructure system 2002 may be shared by multiple users and dynamically re-allocated per demand. Additionally, resources may be allocated to users in different time zones. For example, cloud infrastructure system 2030 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 2032 may be provided that are shared by different components or modules of cloud infrastructure system 2002 and by the services provided by cloud infrastructure system 2002. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 2002 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 2002, and the like.

In one embodiment, as depicted in FIG. 20, cloud management functionality may be provided by one or more modules, such as an order management module 2020, an order orchestration module 2022, an order provisioning module 2024, an order management and monitoring module 2026, and an identity management module 2028. These modules may include or be provided using one or more computers and/or servers, which may be general purpose computers, specialized server computers, server farms, server clusters, or any other appropriate arrangement and/or combination.

In exemplary operation 2034, a customer using a client device, such as client device 2004, 2006 or 2008, may interact with cloud infrastructure system 2002 by requesting one or more services provided by cloud infrastructure system 2002 and placing an order for a subscription for one or more services offered by cloud infrastructure system 2002. In certain embodiments, the customer may access a cloud User Interface (UI), cloud UI 2012, cloud UI 2014 and/or cloud UI 2016 and place a subscription order via these UIs. The order information received by cloud infrastructure system 2002 in response to the customer placing an order may include information identifying the customer and one or more services offered by the cloud infrastructure system 2002 that the customer intends to subscribe to.

After an order has been placed by the customer, the order information is received via the cloud UIs, 2012, 2014 and/or 2016.

At operation 2036, the order is stored in order database 2018. Order database 2018 can be one of several databases operated by cloud infrastructure system 2018 and operated in conjunction with other system elements.

At operation 2038, the order information is forwarded to an order management module 2020. In some instances, order management module 2020 may be configured to perform billing and accounting functions related to the order, such as verifying the order, and upon verification, booking the order.

At operation 2040, information regarding the order is communicated to an order orchestration module 2022. Order orchestration module 2022 may utilize the order information to orchestrate the provisioning of services and resources for the order placed by the customer. In some instances, order orchestration module 2022 may orchestrate the provisioning of resources to support the subscribed services using the services of order provisioning module 2024.

In certain embodiments, order orchestration module 2022 enables the management of business processes associated with each order and applies business logic to determine whether an order should proceed to provisioning. At operation 2042, upon receiving an order for a new subscription, order orchestration module 2022 sends a request to order provisioning module 2024 to allocate resources and configure those resources needed to fulfill the subscription order. Order provisioning module 2024 enables the allocation of resources for the services ordered by the customer. Order provisioning module 2024 provides a level of abstraction between the cloud services provided by cloud infrastructure system 2000 and the physical implementation layer that is used to provision the resources for providing the requested services. Order orchestration module 2022 may thus be isolated from implementation details, such as whether or not services and resources are actually provisioned on the fly or pre-provisioned and only allocated/assigned upon request.

At operation 2044, once the services and resources are provisioned, a notification of the provided service may be sent to customers on client devices 2004, 2006 and/or 2008 by order provisioning module 2024 of cloud infrastructure system 2002.

At operation 2046, the customer's subscription order may be managed and tracked by an order management and monitoring module 2026. In some instances, order management and monitoring module 2026 may be configured to collect usage statistics for the services in the subscription order, such as the amount of storage used, the amount data transferred, the number of users, and the amount of system up time and system down time.

In certain embodiments, cloud infrastructure system 2000 may include an identity management module 2028. Identity management module 2028 may be configured to provide identity services, such as access management and authorization services in cloud infrastructure system 2000. In some embodiments, identity management module 2028 may control information about customers who wish to utilize the services provided by cloud infrastructure system 2002. Such information can include information that authenticates the identities of such customers and information that describes which actions those customers are authorized to perform relative to various system resources (e.g., files, directories, applications, communication ports, memory segments, etc.). Identity management module 2028 may also include the management of descriptive information about each customer and about how and by whom that descriptive information can be accessed and modified.

Figure 21:
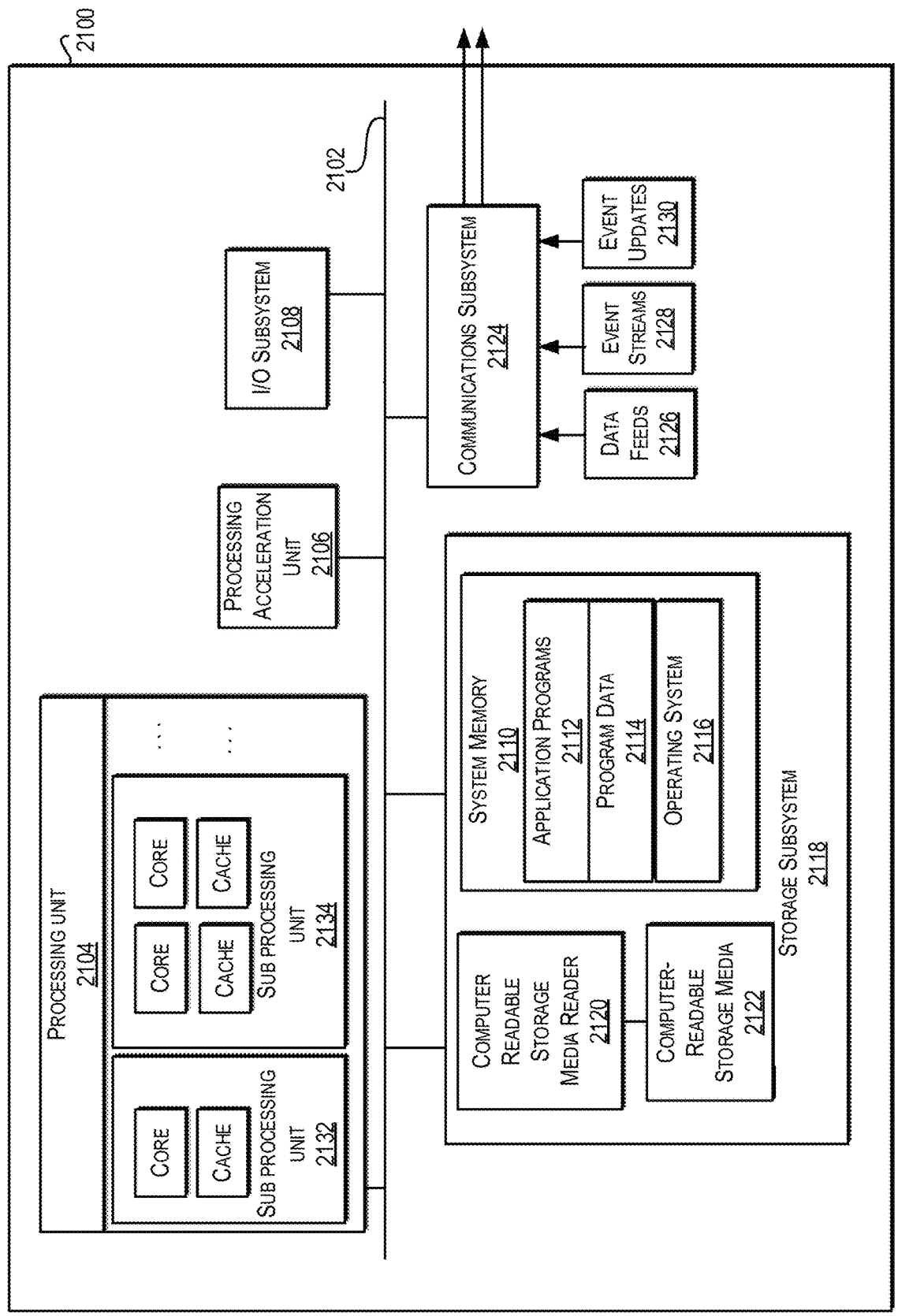
FIG. 21 illustrates an exemplary computer system, in which various embodiments of the present invention may be implemented.

FIG. 21 illustrates an exemplary computer system 2100, in which various embodiments of the present invention may be implemented. The system 2100 may be used to implement any of the computer systems described above. For example, all or some of the elements of the electricity fraud detection system illustrated in FIG. 1 can be included or implemented in the system 2100. As shown in FIG. 21, computer system 2100 includes a processing unit 2104 that communicates with a number of peripheral subsystems via a bus subsystem 2102. These peripheral subsystems may include a processing acceleration unit 2106, an I/O subsystem 2108, a storage subsystem 2118 and a communications subsystem 2124. Storage subsystem 2118 includes tangible computer-readable storage media 2122 and a system memory 2110.

Bus subsystem 2102 provides a mechanism for letting the various components and subsystems of computer system 2100 communicate with each other as intended. Although bus subsystem 2102 is shown schematically as a single bus, alternative embodiments of the bus subsystem may utilize multiple buses. Bus subsystem 2102 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 2104, which can be implemented as one or more integrated circuits (e.g., a conventional microprocessor or microcontroller), controls the operation of computer system 2100. One or more processors may be included in processing unit 2104. These processors may include single core or multicore processors. In certain embodiments, processing unit 2104 may be implemented as one or more independent processing units 2132 and/or 2134 with single or multicore processors included in each processing unit. In other embodiments, processing unit 2104 may also be implemented as a quad-core processing unit formed by integrating two dual-core processors into a single chip.

In various embodiments, processing unit 2104 can execute a variety of programs in response to program code and can maintain multiple concurrently executing programs or processes. At any given time, some or all of the program code to be executed can be resident in processor(s) 2104 and/or in storage subsystem 2118. Through suitable programming, processor(s) 2104 can provide various functionalities described above. Computer system 2100 may additionally include a processing acceleration unit 2106, which can include a digital signal processor (DSP), a special-purpose processor, and/or the like.

I/O subsystem 2108 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 2100 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 2100 may comprise a storage subsystem 2118 that comprises software elements, shown as being currently located within a system memory 2110. System memory 2110 may store program instructions that are loadable and executable on processing unit 2104, as well as data generated during the execution of these programs.

Depending on the configuration and type of computer system 2100, system memory 2110 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 2104. In some implementations, system memory 2110 may include multiple different types of memory, such as static random access memory (SRAM) or dynamic random access memory (DRAM). In some implementations, a basic input/output system (BIOS), containing the basic routines that help to transfer information between elements within computer system 2100, such as during start-up, may typically be stored in the ROM. By way of example, and not limitation, system memory 2110 also illustrates application programs 2112, which may include client applications, Web browsers, mid-tier applications, relational database management systems (RDBMS), etc., program data 2114, and an operating system 2116. By way of example, operating system 2116 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 2118 may also provide a tangible computer-readable storage medium for storing the basic programming and data constructs that provide the functionality of some embodiments. Software (programs, code modules, instructions) that when executed by a processor provide the functionality described above may be stored in storage subsystem 2118. These software modules or instructions may be executed by processing unit 2104. Storage subsystem 2118 may also provide a repository for storing data used in accordance with the present invention.

Storage subsystem 2100 may also include a computer-readable storage media reader 2120 that can further be connected to computer-readable storage media 2122. Together and, optionally, in combination with system memory 2110, computer-readable storage media 2122 may comprehensively represent remote, local, fixed, and/or removable storage devices plus storage media for temporarily and/or more permanently containing, storing, transmitting, and retrieving computer-readable information.

Computer-readable storage media 2122 containing code, or portions of code, can also include any appropriate media known or used in the art, including storage media and communication media, such as but not limited to, volatile and non-volatile, removable and non-removable media implemented in any method or technology for storage and/or transmission of information. This can include tangible, non-transitory computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. When specified, this can also include nontangible, transitory computer-readable media, such as data signals, data transmissions, or any other medium which can be used to transmit the desired information and which can be accessed by computing system 400.

By way of example, computer-readable storage media 2122 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 2122 may include, but is not limited to, Zip® drives, flash memory cards, universal serial bus (USB) flash drives, secure digital (SD) cards, DVD disks, digital video tape, and the like. Computer-readable storage media 2122 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 2100.

Communications subsystem 2124 provides an interface to other computer systems and networks. Communications subsystem 2124 serves as an interface for receiving data from and transmitting data to other systems from computer system 2100. For example, communications subsystem 2124 may enable computer system 2100 to connect to one or more devices via the Internet. In some embodiments communications subsystem 2124 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 2124 can provide wired network connectivity (e.g., Ethernet) in addition to or instead of a wireless interface.

In some embodiments, communications subsystem 2124 may also receive input communication in the form of structured and/or unstructured data feeds 2126, event streams 2128, event updates 2130, and the like on behalf of one or more users who may use computer system 2100.

By way of example, communications subsystem 2124 may be configured to receive data feeds 2126 in real-time from users of social media networks and/or other communication services such as Twitter® feeds, Facebook® updates, web feeds such as Rich Site Summary (RSS) feeds, and/or real-time updates from one or more third party information sources.

Additionally, communications subsystem 2124 may also be configured to receive data in the form of continuous data streams, which may include event streams 2128 of real-time events and/or event updates 2130, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 2124 may also be configured to output the structured and/or unstructured data feeds 2126, event streams 2128, event updates 2130, and the like to one or more databases that may be in communication with one or more streaming data source computers coupled to computer system 2100.

Computer system 2100 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 2100 depicted in FIG. 21 is intended only as a specific example. Many other configurations having more or fewer components than the system depicted in FIG. 21 are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method for detecting electricity fraud, the method comprising:
    accessing a known dataset, the known dataset including first data items associated with known cases of electrical fraud;
    determining a set of suspicious known cases by at least applying a detector behavior of a model to the first data items;
    determining, from the set of suspicious known cases, a set of explained known cases by analyzing each of the known cases in the set of suspicious known cases against one or more false positive explanations of the model, wherein the set of explained known cases is a subset of the set of suspicious known cases;
    validating the model based on the determined set of suspicious known cases;
    access an unknown dataset, the unknown dataset including second data items associated with unknown cases of electrical fraud at a plurality of service points, wherein each service point of the plurality of service points corresponds to an electricity meter, and wherein the second data items include electricity demand associated with the electricity meter corresponding to each service point;
    determining a set of suspicious unknown cases by at least applying the detector behavior to the second data items;
    determining, from the set of suspicious unknown cases, a set of explained unknown cases by analyzing each of the unknown cases in the set of suspicious unknown cases against the one or more false positive explanations, wherein the set of explained unknown cases is a subset of the set of suspicious unknown cases; and
    determining a set of unexplained unknown cases by subtracting the set of explained unknown cases from the set of suspicious unknown cases, Wherein the set of unexplained unknown cases is a subset of the set of suspicious unknown cases that does not overlap with the set of explained unknown cases.

2. The computer-implemented method of claim 1, wherein the detector behavior includes a sudden increase in electricity demand followed by the electricity demand remaining low.

3. The computer-implemented method of claim 1, wherein the detector behavior includes a slow decrease in electricity demand followed by the electricity demand remaining low.

4. The computer-implemented method of claim 1, wherein the detector behavior includes a slow decrease in electricity demand over an extended period of time.

5. The computer-implemented method of claim 1, wherein the detector behavior includes a very low electricity demand.

6. The computer-implemented method of claim 1, wherein the detector behavior includes the electricity demand failing to rise as expected.

7. The computer-implemented method of claim 1, wherein the detector behavior includes the electricity demand being abnormally stable.

8. A computing system comprising:
    one or more data stores storing:
        a known dataset including first data items associated with known cases of electrical fraud;
        an unknown dataset including second data items associated with unknown cases of electrical fraud at a plurality of service points, wherein each service point of the plurality of service points corresponds to an electricity meter, and wherein the second data items include electricity demand associated with the electricity meter corresponding to each service point;
    a computer processor; and
    memory storing program instructions configured for execution by the computer processor in order to cause the computer processor to:
        access the known dataset;
        determine a set of suspicious known cases by at least applying a detector behavior of a model to the first data items;
        determine, from the set of suspicious known cases, a set of explained known cases by analyzing each of the known cases in the set of suspicious known cases against one or more false positive explanations of the model, wherein the set of explained known cases is a subset of the set of suspicious known cases;
        validate the model based on the determined set of suspicious known cases;
        access the unknown dataset;
        determine a set of suspicious unknown cases by at least applying the detector behavior to the second data items;
        determine, from the set of suspicious unknown cases, a set of explained unknown cases by analyzing each of the unknown cases in the set of suspicious unknown cases against the one or more false positive explanations, wherein the set of explained unknown cases is a subset of the set of suspicious unknown cases; and
        determine a set of unexplained unknown cases by subtracting the set of explained unknown cases from the set of suspicious unknown cases, wherein the set of unexplained unknown cases is a subset of the set of suspicious unknown cases that does not overlap with the set of explained unknown cases.

9. The computing system of claim 8, wherein the detector behavior includes a sudden increase in electricity demand followed by the electricity demand remaining low.

10. The computing system of claim 8, wherein the detector behavior includes a slow decrease in electricity demand followed by the electricity demand remaining low.

11. The computing system of claim 8, wherein the detector behavior includes a slow decrease in electricity demand over an extended period of time.

12. The computing system of claim 8, wherein the detector behavior includes a very low electricity demand.

13. The computing system of claim 8, wherein the detector behavior includes the electricity demand failing to rise as expected.

14. The computing system of claim 8, wherein the detector behavior includes the electricity demand being abnormally stable.

15. A non-transitory computer-readable medium containing program instructions configured for execution by a computer processor in order to cause the computer processor to:

access a known dataset including first data items associated with known cases of electrical fraud;

determine a set of suspicious known cases by at least applying a detector behavior of a model to the first data items;

determine, from the set of suspicious known cases, a set of explained known cases by analyzing each of the known cases in the set of suspicious known cases against one or more false positive explanations of the model, wherein the set of explained known cases is a subset of the set of suspicious known cases;

validate the model based on the determined set of suspicious known cases;

access an unknown dataset including second data items associated with unknown cases of electrical fraud at a plurality of service points, wherein each service point of the plurality of service points corresponds to an electricity meter, and wherein the second data items include electricity demand associated with the electricity meter corresponding to each service point;

determine a set of suspicious unknown cases by at least applying the detector behavior to the second data items;

determine, from the set of suspicious unknown cases, a set of explained unknown cases by analyzing each of the unknown cases in the set of suspicious unknown cases against the one or more false positive explanations, wherein the set of explained unknown cases is a subset of the set of suspicious unknown cases; and determine a set of unexplained unknown cases by subtracting the set of explained unknown cases from the set of suspicious unknown cases, wherein the set of unexplained unknown cases is a subset of the set of suspicious unknown cases that does not overlap with the set of explained unknown cases.

16. The non-transitory computer-readable medium of claim 15, wherein the detector behavior includes a sudden increase in electricity demand followed by the electricity demand remaining low.

17. The non-transitory computer-readable medium of claim 15, wherein the detector behavior includes a slow decrease in electricity demand followed by the electricity demand remaining low.

18. The non-transitory computer-readable medium of claim 15, wherein the detector behavior includes a slow decrease in electricity demand over an extended period of time.

19. The non-transitory computer-readable medium of claim 15, wherein the detector behavior includes a very low electricity demand.

20. The non-transitory computer-readable medium of claim 15, wherein the detector behavior includes the electricity demand failing to rise as expected.

* * * * *

UNITED STATES PATENT AND TRADEMARK OFFICE
CERTIFICATE OF CORRECTION

PATENT NO. : 10,656,190 B2  
APPLICATION NO. : 15/820326  
DATED : May 19, 2020  
INVENTOR(S) : Abbas Page 1 of 1

It is certified that error appears in the above-identified patent and that said Letters Patent is hereby corrected as shown below:

In the Drawings

On sheet 16 of 27, in FIG. 10, Line 9, delete "Follup" and insert -- Follow up --, therefor.

On sheet 16 of 27, in FIG. 10, Line 12, delete "Follup" and insert -- Follow up --, therefor.

In the Specification

In Column 6, Line 1, delete "Linkedln," and insert -- LinkedIn, --, therefor.

In Column 6, Line 2, delete "Linkedln," and insert -- LinkedIn, --, therefor.

In Column 6, Line 16, delete "media))used" and insert -- media)) used --, therefor.

In the Claims

In Column 38, Line 3, in Claim 1, delete "Wherein" and insert -- wherein --, therefor.

In Column 39, Line 7, in Claim 10, delete "computing;" and insert -- computing --, therefor.

Signed and Sealed this  
Fourth Day of May, 2021

Drew Hirshfeld  
*Performing the Functions and Duties of the*  
*Under Secretary of Commerce for Intellectual Property and*  
*Director of the United States Patent and Trademark Office*